(12) United States Patent
Matsumoto et al.

(10) Patent No.: US 8,423,999 B2
(45) Date of Patent: Apr. 16, 2013

(54) COMPUTER SYSTEM, VIRTUAL MACHINE MONITOR AND SCHEDULING METHOD FOR VIRTUAL MACHINE MONITOR

(75) Inventors: Shuhei Matsumoto, Yokohama (JP); Hironori Inoue, Ebina (JP); Shintaro Wada, Hadano (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 12/834,374

(22) Filed: Jul. 12, 2010

(65) Prior Publication Data

US 2011/0010713 A1    Jan. 13, 2011

(30) Foreign Application Priority Data

Jul. 13, 2009   (JP) ................. 2009-164360

(51) Int. Cl.
*G06F 9/455* (2006.01)
*G06F 9/46* (2006.01)

(52) U.S. Cl.
USPC .............................. 718/1; 718/102

(58) Field of Classification Search .............. None
See application file for complete search history.

(56) References Cited

U.S. PATENT DOCUMENTS

| 2006/0005190 A1* | 1/2006 | Vega et al. ................ 718/1 |
| 2008/0184227 A1* | 7/2008 | Matsumoto et al. ......... 718/1 |
| 2010/0235835 A1* | 9/2010 | Nishiguchi et al. ........ 718/1 |

FOREIGN PATENT DOCUMENTS

| JP | 6-44087 A | 2/1994 |
| JP | 2008-186210 A | 8/2000 |
| JP | 2009-9275 A | 1/2009 |

OTHER PUBLICATIONS

K. Tian et al., How virtualization makes power management different, Proceedings of the Linux Symposium, vol. 1, pp. 205-214, Jun. 27-30, 2007 (www.kernel.org/doc/ols12007.o1s2007v1•pages• 205•214.pdf).

* cited by examiner

*Primary Examiner* — Kenneth Tang
(74) *Attorney, Agent, or Firm* — Mattingly & Malur, PC

(57) ABSTRACT

In a computer system according to the background art, when a request to halt a virtual processor was detected, the virtual processor was blocked. In the blocking method, latency of virtual halt exit of the virtual processor was so long that a problem of performance was caused. A virtual machine monitor selects either of a busy wait method for making repeatedly examination until the virtual halt state exits while the virtual processor stays on the physical processor and a blocking method for stopping execution of the virtual processor and scheduling other virtual processors on the physical processor while yielding the operating physical processor and checking off scheduling of the virtual processor to the physical processor, based on a virtual processor halt duration predicted value of the virtual processor which is an average value of latest N virtual processor halt durations of the virtual processor.

8 Claims, 15 Drawing Sheets

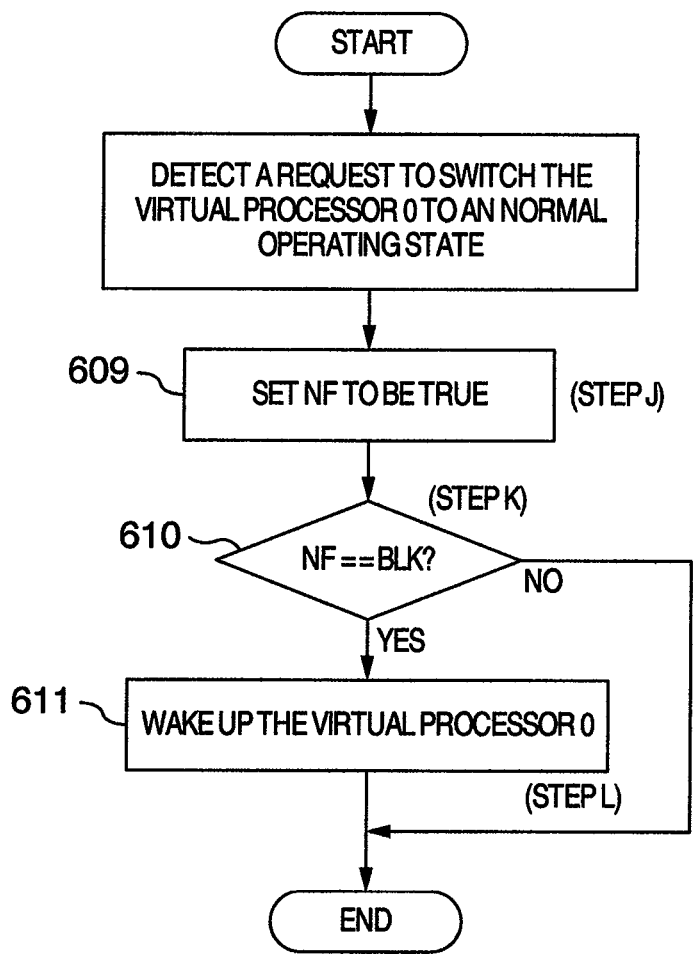

COMPUTER SYSTEM, VIRTUAL MACHINE MONITOR AND SCHEDULING METHOD FOR VIRTUAL MACHINE MONITOR

INCORPORATION BY REFERENCE

The present application claims priority from Japanese application JP2009-164360 filed on Jul. 13, 2009, the content of which is hereby incorporated by reference into this application.

BACKGROUND OF THE INVENTION

1. Field of the Invention

The present invention relates to a virtual machine system and particularly relates to a method in which a virtual machine monitor controls scheduling of virtual processors.

2. Description of the Related Art

Power consumption has increased as processor performance has increased with the advance of processor multiplexing and increase in cache capacity. For this reason, processor power control techniques have advanced with the advance of the aforementioned techniques. A recent processor has a normal operating state and a halt state and has a processor power control function for switching one of the two states to the other state. When the processor is in the halt state, the processor suspends execution and resources of the processor are released to reduce power consumption of the processor. A general purpose operating system uses the processor power control function to halt the processor to thereby save power consumption when there is no program executed on the processor.

In a virtual machine system having a larger number of virtual processors than the number of physical processors, processor-share efficiency is very important. A method in a virtual machine system in which a virtual machine monitor detects a request to halt a virtual processor, blocks the virtual processor and gives physical processor resources to another virtual processor has been described in "How virtualization makes power management different", [online] <URL:http://ols.108.redhat.com/2007/Reprints/ke-Reprint.pdf, issued by Intel Corp. and JP-A-2008-186210.

The blocking method is however large in processing time cost. The processing time cost of the context switch of the blocking method affects latency of halt exit of the virtual processor. The value of the latency causes a performance issue for some work loads.

A method for reducing the processing time cost of the blocking method has been described in JP-A-Hei-06-044087. A method for deferring execution of blocking based on processor utilization ratio in the blocking method has been described in JP-A-2009-009275.

In the background-art virtual machine system according to "How virtualization makes power management different", [online], issued by Intel Corp., the virtual machine monitor blocks the virtual processor until the virtual processor exits from the virtual halt state when the virtual machine monitor detects a request to halt the virtual processor. In the blocking method, latency of virtual halt exit of the virtual processor is so large that the value of the latency causes a performance issue when the virtual processor is halted frequently.

In the background-art method according to JP-A-Hei-06-044087, there has been proposed a method in which if there is no other process waiting for the processor when a certain process yields a processor, context switching is skipped and an idle process is executed with context of the certain process. However in this method, context saving of the virtual processor is only deferred. Accordingly, this method cannot be applied to a virtual machine system in which a large number of virtual processors operate, because there is a high possibility of failure of skipping context switching and the physical processor utilization ratio may became low. Moreover, because context switching is skipped but process scheduling is not skipped, the cost which can be reduced is partial.

In the background-art method according to JP-A-2009-009275, there has been proposed a method in which if the processor utilization ratio of the process is larger than a predetermined threshold in the case where an idle processor remains after the processor is yielded when the process executes a blocking method, execution of the blocking method is deferred to make the process remain on the processor to thereby avoid the blocking method. However for quite a few work loads the processor is halted frequently but the virtual processor utilization ratio may be low. In this case, it is uncertain from the processor utilization ratio that it is necessary to reduce the processing time required for switching the virtual processor from a virtual halt state to a virtual normal operating state.

On the other hand, in the background-art method according to "How virtualization makes power management different", [online], issued by Intel Corp. and JP-A-2008-186210, while a virtual processor is blocked, a physical processor is allocated to another virtual processor to thereby achieve a high physical processor utilization ratio. Moreover, when an idle physical processor remains after a virtual processor is blocked, the physical processor is halted to reduce power consumption until the virtual processor to be scheduled is found. The high physical processor utilization ratio and the reduction of power consumption are very important in a virtual machine system which has, as a main object, server integration for integrating a plurality of computers into one physical computer.

SUMMARY OF THE INVENTION

An object of the invention is to provide a virtual machine system in which the processing time required for switching a virtual processor from a virtual halt state to a virtual normal operating state is reduced to resume the execution of the program on the virtual processor quickly when the virtual processor is halted frequently as long as the physical processor utilization ratio and the reduction of power consumption equivalent to those in the background-art method are guaranteed.

The invention provides a method in which a virtual machine monitor controls switching of a virtual processor between a virtual normal operating state and a virtual halt state and scheduling of the virtual processor.

In the invention, a time range of from the start of virtual halt enter of each virtual processor to the completion of the virtual halt exit is regarded as a virtual processor halt duration, an average of latest N virtual processor halt durations of each virtual processor is regarded as a virtual processor halt duration predicted value of the virtual processor, the new virtual processor halt duration is added to the previous sum of latest N virtual processor halt durations and the oldest virtual processor halt duration is subtracted from the sum and then the updated sum of latest N virtual processor halt durations is divided by N to thereby calculate a virtual processor halt duration predicted value of the virtual processor which will be halted at next time, in a constant processing time with use of only information of the virtual processor without necessity of full summation of virtual processor halt durations each time.

When a virtual processor waits for virtual halt exit, the virtual processor halt duration predicted value is added to the current time to thereby calculate a virtual processor halt exit time predicted value of the virtual processor.

When the blocking method is selected as a virtual processor's virtual halt exit wait method, the calculated virtual processor halt exit time predicted values are sorted in ascending order of the latest due date and inserted in a virtual processor halt exit time management queue corresponding to each physical processor. When the virtual processor exits from the virtual halt, the virtual processor's halt exit time predicted values is removed from the management queue.

The virtual machine monitor has the two methods of a busy wait method and a blocking method as methods in which a virtual processor in a virtual halt state waits for virtual halt exit. The busy wait method is a method for performing repeated examination until the virtual processor exits from the virtual halt state. The blocking method is a method for suspending execution of the virtual processor, yielding the operating physical processor, checking off scheduling of the virtual processor on the physical processor until the virtual processor exits from the virtual halt state, and scheduling other virtual processors on the physical processor while execution of the virtual processor is suspended. Either of the busy wait method and the blocking method is selected and executed dynamically in accordance with the calculated virtual processor halt duration predicted value of the virtual processor.

The selection process is as follows. When the virtual processor halt duration predicted value of the virtual processor is smaller than a predetermined processing time cost of the blocking method, the virtual machine monitor selects the busy wait method regardless of whether there is any virtual processor waiting for the currently operating physical processor or not. When the virtual processor halt duration predicted value of the virtual processor is not smaller than the processing time cost of the blocking method and there is any virtual processor waiting for the currently operating physical processor, the virtual machine monitor selects the blocking method. When the virtual processor halt duration predicted value of the virtual processor is not smaller than a predetermined virtual processor halt duration threshold for deciding whether the operation of the virtual processor on the currently operating physical processor is continued or not, the virtual machine monitor selects the blocking method. When the virtual processor halt duration predicted value of the virtual processor is not smaller than the processing time cost of the blocking method and smaller than the virtual processor halt duration threshold and there is no other virtual processor waiting for the currently operating physical processor and the virtual processor halt exit time predicted value of the virtual processor is not smaller than the time of the head of the virtual processor halt exit time management queue of the physical processor on which the virtual processor operates, the virtual machine monitor selects the blocking method. When the virtual processor halt duration predicted value of the virtual processor is not smaller than the processing time cost of the blocking method and smaller than the virtual processor halt duration threshold and there is no other virtual processor waiting for the currently operating physical processor and the virtual processor halt exit time predicted value of the virtual processor is smaller than the time of the head of the virtual processor halt exit time management queue of the physical processor on which the virtual processor operates, the virtual machine monitor selects the busy wait method.

In the invention, when a busy wait method is selected and executed as a method in which a virtual processor in a virtual halt state waits for virtual halt exit, the processing time cost required for switching the virtual processor from the virtual halt state to the virtual normal operating state can be reduced and execution of a program on the virtual processor can be resumed rapidly.

Incidentally, when another virtual processor than the virtual processor waiting for virtual halt exit is present as a virtual processor allowed to be executed on the physical processor, the blocking method is selected and executed to guarantee the same physical processor utilization ratio as that in the background-art method.

When an idle process is running on the physical processor or when the virtual processor waits for virtual halt exit by the busy wait method, the physical processor is halted to guarantee the same reduction in power consumption of the physical processor as that in the background-art method.

BRIEF DESCRIPTION OF THE DRAWINGS

FIG. 7 is a flow chart of a virtual processor resume notification process;

DETAILED DESCRIPTION OF THE INVENTION

An embodiment of the invention will be described in detail with reference to the drawings.

Figure 1:
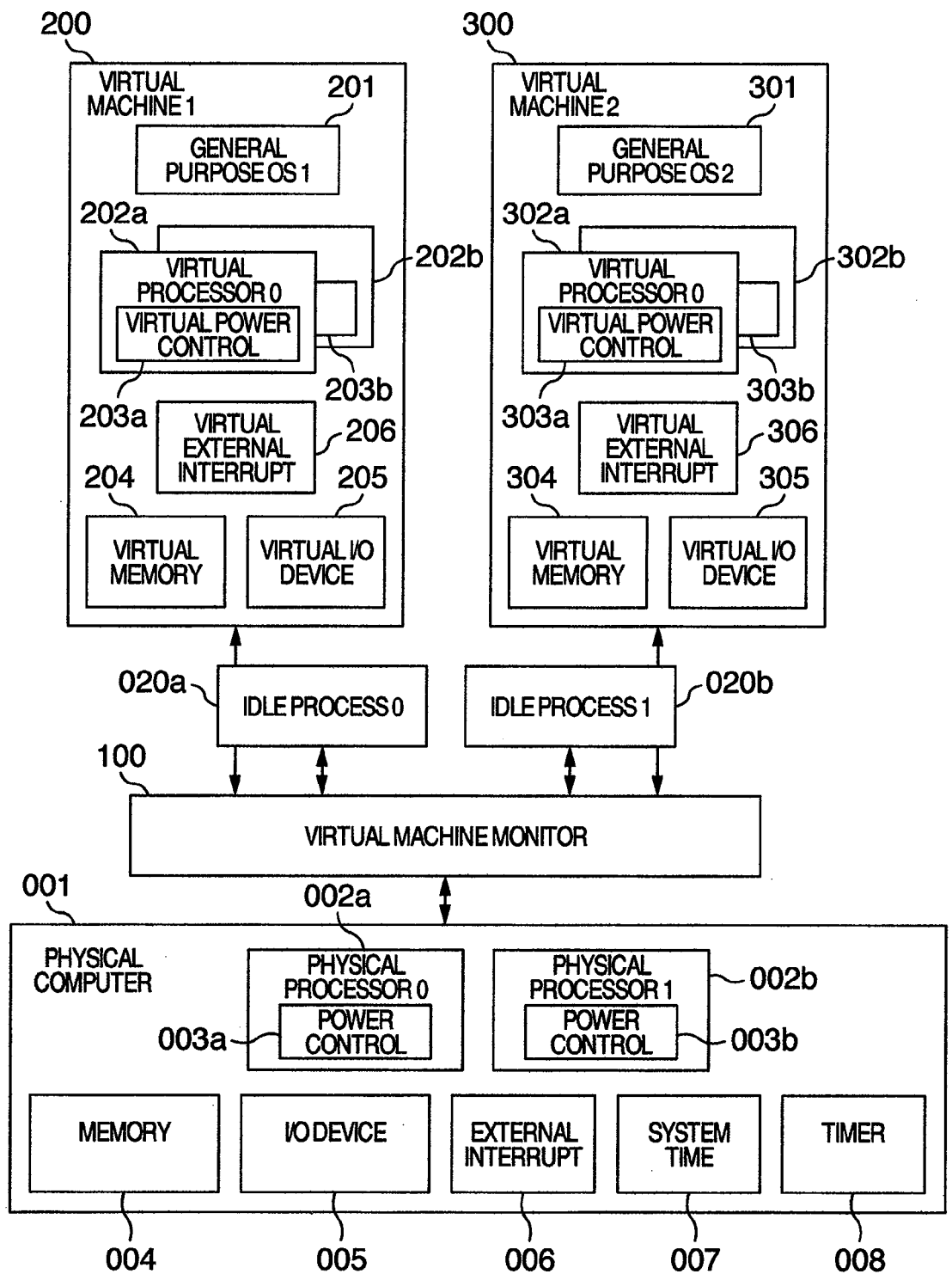
FIG. 1 is a configuration diagram showing a virtual machine system according to an embodiment of the invention.

FIG. 1 is a configuration diagram showing the outline of a virtual machine system according to the invention. The virtual machine system is roughly classified into a physical computer 001, a virtual machine monitor 100 and first and second virtual machines 200 and 300.

The physical computer includes a physical processor 0 (002*a*), a physical processor 1 (002*b*), a memory 004, at least one I/O device 005, an external interrupt mechanism 006, a system time 007, and a timer 008.

The physical processors 0 (002*a*) and 1 (002*b*) are of such a type that a general purpose operating system can operate. The physical processors 0 (002*a*) and 1 (002*b*) include power control functions 003*a* and 003*b* respectively. Although FIG. 1 shows the case where the number of physical processors is 2, the number of physical processors in the invention is not limited. The invention can be applied to a physical computer having one physical processor or an arbitrary number of physical processors.

Although a recent physical processor normally has a processor virtualization assisting function, it does not matter whether each physical processor in the invention has a processor virtualization assisting function or not. A processor virtualization function is not shown in FIG. 1 for simplification of description.

The memory 004 is used as a volatile storage device for programs and data.

The I/O device 005 includes a disk controller for driving a disk drive, and a network interface for communicating with an external computer system through a network. In this embodiment, details of the I/O device 005 are no object.

The external interrupt mechanism 006 has a function of notifying the physical processors 0 (002*a*) and 1 (002*b*) of occurrence of an event asynchronously. Although it is conceivable that the external interrupt mechanism 006 is used for notifying the physical processor 0 (002*a*) or 1 (002*b*) of command completion through the I/O device 005, notifying the physical processor 0 (002*a*) or 1 (002*b*) of a expiration of the timer 008, inter-processor interrupt from one of the physical processors 0 (002*a*) and 1 (002*b*) to the other physical processor, etc., the detailed purpose of the external interrupt mechanism 006 in the invention is no object.

The system time 007 is a time which is common to all physical processors and which is used so that the virtual machine monitor 001 can refer to the current time and the lapsed time. When the physical computer is used alone or when the physical computer 001 and the virtual machine monitor 100 cooperate with each other, the system time 007 always guarantees synchronization between the physical processors. In this embodiment, the method of implementing the system time is no object.

The timer 008 has a function of generating external interrupt of the physical processor 0 (002*a*) or 1 (002*b*) through the external interrupt mechanism 006 at a designated time. The timer 008 is used when the virtual machine monitor 100 time-shares the physical processors 0 (002*a*) and 1 (002*b*) of the physical computer 001 in a time slicing manner.

As described above, the physical processors 0 (002*a*) and 1 (002*b*) of the physical computer have the power control functions 003*a* and 003*b* respectively. Each power control function has a normal operating state and a halt state and has a function of switching one of the two states to the other state. When a physical processor is in a halt state, the physical processor suspends execution and releases resources of the physical processor to thereby reduce power consumption of the physical processor. When there is no program to be executed on a processor, the general purpose operating system uses the power control function to halt the processor to thereby save power consumption. Switching from the normal operating state to the halt state of a processor is performed based on a request issued from a program on the processor to the processor through the issue of a processor halt instruction normally provided in the processor. Switching from the halt state to the normal operating state of a processor is performed based on a request issued from the external interrupt mechanism to the processor through the issue of an external interrupt.

The basic purpose of the processor power control function in the general purpose operating system will be described here. As will be described later, each of virtual processors of the virtual machines in the invention has a virtual power control function. In the following description, "physical" or "virtual" is not attached to the head of each term so that the term can be applied to both the physical computer and the virtual machine.

The case where the general purpose operating system uses the power control function to halt a processor is roughly classified into the first case where the processor is idle and the second case where the processor waits for command completion notification from the I/O device under work load execution or waits for unlocking in parallel processing. Hereinafter, the first case is referred to as the case where the processor is idle, and the second case is referred to as the case where the processor waits for a synchronization event.

Figure 2A:
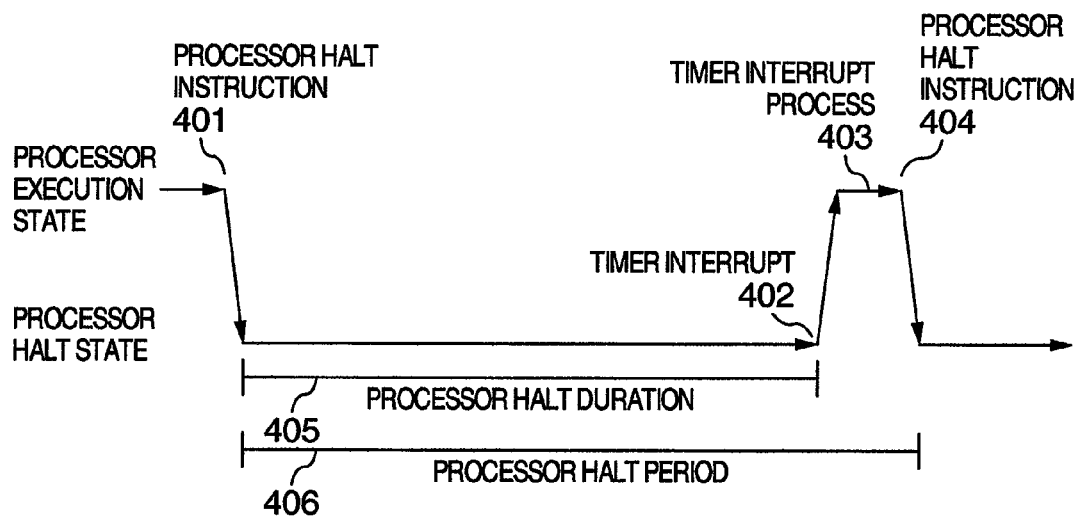
FIGS. 2A and 2B are conceptual views showing the intended purpose of a processor power control function of a general purpose operating system in time sequence.

FIG. 2A is a conceptual view showing switching from one of the normal operating state and the halt state to the other state in time sequence in the first case where the processor is idle. The general purpose operating system puts the processor in the halt state (step 401). When a timer interrupt of a sufficiently long period is transmitted to the processor, the halt state is canceled to resume the normal operating state (step 402). The general purpose operating system performs a timer interrupt process (step 403). When the timer interrupt process is completed, the general purpose operating system switches the processor to the halt state again (step 404). This series of operations is repeated.

Figure 2B:
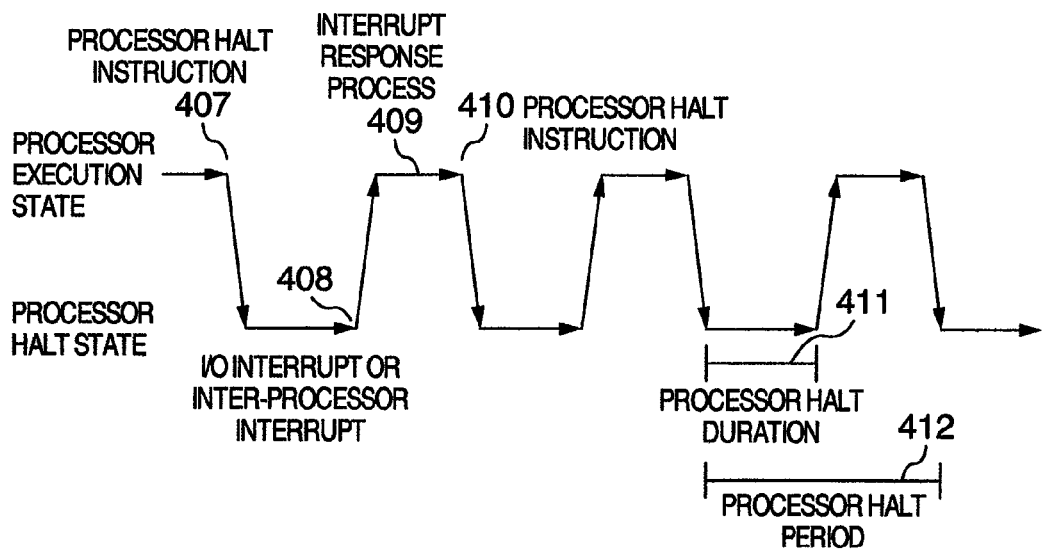

FIG. 2B is a conceptual view showing switching from one of the normal operating state and the halt state to the other state in time sequence in the second case where the processor waits for a synchronization event. The general purpose operating system puts the processor in the halt state (step 407). When an I/O interrupt or an inter-processor interrupt of a very short and almost constant period is transmitted to the processor, the halt state is canceled to resume the normal operating state (step 408). The general purpose operating system performs a process required by the external interrupt (step 409). When the requested process is completed, the general purpose operating system switches the processor to the halt state again (step 410). This series of operations is repeated.

The case where the processor is idle and the case where the processor waits for a synchronization event are different in the lengths of the processor halt period and the processor halt duration. The processor halt period 412 and the processor halt duration 411 in the case where the processor waits for a synchronization event are both very short compared with those in the case where the processor is idle. The case where the processor is idle and the case where the processor waits for a synchronization event resemble each other in that the processor halt duration in each case takes an almost constant value steadily.

The virtual machine monitor 100 is a control program for controlling resources of the physical computer 001 and constructing virtual machines each of which is a program execution environment where a program represented by a general purpose operating system recognizes the virtual machine as one computer, so that a program can be operated on the virtual machine equivalently to the physical computer 001 except a little performance degradation and a difference in timing compared with the physical computer 001.

The virtual machine monitor 100 controls resources of the physical computer 001 and constructs the first virtual machine 200 having virtual processors 0 (202a) and 1 (202b), a virtual memory 204, a virtual I/O device 205 and a virtual external interrupt mechanism 206 and the second virtual machine 300 having virtual processors 0 (302a) and 1 (302b), a virtual memory 304, a virtual I/O device 305 and a virtual external interrupt mechanism 306.

A first general purpose operating system 201 and a second general purpose operating system 301 operate on the first virtual machine 200 and the second virtual machine 300 respectively. It is conceivable that the first general purpose operating system 201 and the second general purpose operating system 301 use the virtual power control functions of the virtual processors (which will be described later) for the aforementioned purpose.

The virtual memory 204 and the virtual I/O device 205 of the first virtual machine 200 and the virtual memory 304 and the virtual I/O device 305 of the second virtual machine 300 may be implemented by logically partitioned resources of the physical computer 001 in accordance with the virtual machine monitor 100 or by shared resources of the physical computer 001 or may be implemented by resources not present in the physical computer 001 but virtually created by the virtual machine monitor 100. Although it is conceivable that the virtual memories 204 and 304 and the virtual I/O devices 205 and 305 in this embodiment have the same functions as those of the physical computer 001 when viewed from programs on the first virtual machine 200 and the second virtual machine 300, details thereof are no object.

Each of the virtual external interrupt mechanism 206 of the first virtual machine 200 and the virtual external interrupt mechanism 306 of the second virtual machine 300 has the same function as the physical external interrupt mechanism 006 of the physical computer 001 when viewed from programs on the first virtual machine 200 and the second virtual machine 300. The virtual machine monitor 100 virtually implements the virtual external interrupt mechanisms 206 and 306 so that the virtual external interrupt mechanisms 206 and 306 operate independently of the physical mechanism. Each virtual external interrupt mechanism has a function of notifying the virtual processor of occurrence of an event asynchronously. The virtual external interrupt mechanism further has a function sufficient to implement command completion notification issued from the virtual I/O device to a virtual processor, virtual inter-processor interrupt issued from a certain virtual processor to a designated virtual processor inclusive of the certain virtual machine itself, etc. In this embodiment, details of the method of implementing the virtual external interrupt mechanism are no object.

The virtual processors 0 (202a) and 1 (202b) of the first virtual machine 200 and the virtual processors 0 (302a) and 1 (302b) of the second virtual machine 300 have virtual power control functions 203a, 203b, 303a and 303b respectively. Each virtual power control function has a virtual normal operating state and a virtual halt state and has a function of switching one of the two states to the other state, just like the power control function of the physical processor.

In the virtual machine system according to the invention, the virtual machine monitor 100 detects the aforementioned processor halt instruction issued by a program on a virtual processor without direct hardware execution to thereby virtually implement switching from the normal operating state of the virtual processor to the virtual halt state independently of the power control function of the physical processor.

The virtual machine monitor 100 further uses the aforementioned virtual external interrupt mechanism to thereby virtually implement switching from the virtual halt state to the virtual normal operating state of a virtual processor independently of the power control function of the physical processor.

The virtual machine monitor 100 time-shares the physical processors 0 (002a) and 1 (002b) of the physical computer 001 among the virtual processors 0 (202a) and 1 (202b) of the first virtual machine 200 and the virtual processors 0 (302a) and 2 (302b) of the second virtual computer 300. A program on each virtual processor is executed when the virtual machine monitor 100 schedules the virtual processor on either of the physical processors 0 (002a) and 1 (002b) of the physical computer 001.

The virtual machine monitor 100 associates idle processes 020a and 020b with the physical processors 0 (002a) and 1 (002b) respectively. When a virtual processor to be scheduled on the physical processor is not found, the virtual machine monitor 100 executes a corresponding idle process on the physical processor until the virtual processor to be scheduled on the physical processor is found.

When a physical processor is allocated to a virtual processor, the virtual machine monitor 100 gives a short processor duration called "time slice" to the virtual processor. The general purpose operating system which operates on the virtual processor may halt the virtual processor by issuing a request to switch the virtual processor to the halt state before all the given time slice is spent. The main cause is the case where the processor is idle or the case where the processor waits for a synchronization event under work load execution.

In the case where the virtual processor need be halted to wait for a synchronization event under work load execution, both the virtual processor halt period and the virtual processor halt duration are very short compared with those in the case where the virtual processor is idle. Accordingly, latency from halt exit of the virtual processor to resume of the execution of the program on the virtual processor need be short because of the performance of the work load.

On the other hand, when a virtual processor need be halted, the virtual processor is handed over to a physical processor immediately and the physical processor is allocated to the other virtual processors until the halt of the virtual processor is canceled, so that the physical processor can be used efficiently. Moreover, an idle physical processor may remain in the yielding process so that an idle process is executed. In this case, power consumption can be saved when the idle process puts the physical processor in the halt state. When the virtual machine system is used for the purpose of server integration to consolidate a plurality of computers into one physical computer, utilization efficiency (inclusive of power saving) of the physical processor is particularly important.

As described above, in the virtual machine system, performance of each virtual processor concerned with the halt of the virtual processor and utilization efficiency (inclusive of power saving) of each physical processor are both important.

The virtual processor scheduling method according to the invention intends to shorten the latency from the halt exit of a virtual processor to the resume of the execution of the program on the virtual processor when the virtual processor need be halted to wait for an event under work load execution as long as efficiency of use of the physical processor can be guaranteed. The virtual processor scheduling method according to the invention includes the two methods of a blocking method for guaranteeing efficiency of use of each processor and a busy wait method for shortening the latency of halt exit of the virtual processor as virtual processor halt exit wait methods. One of the two methods is selected dynamically based on information of the virtual processor halt duration and executed whenever a virtual processor is halted.

Figure 3:
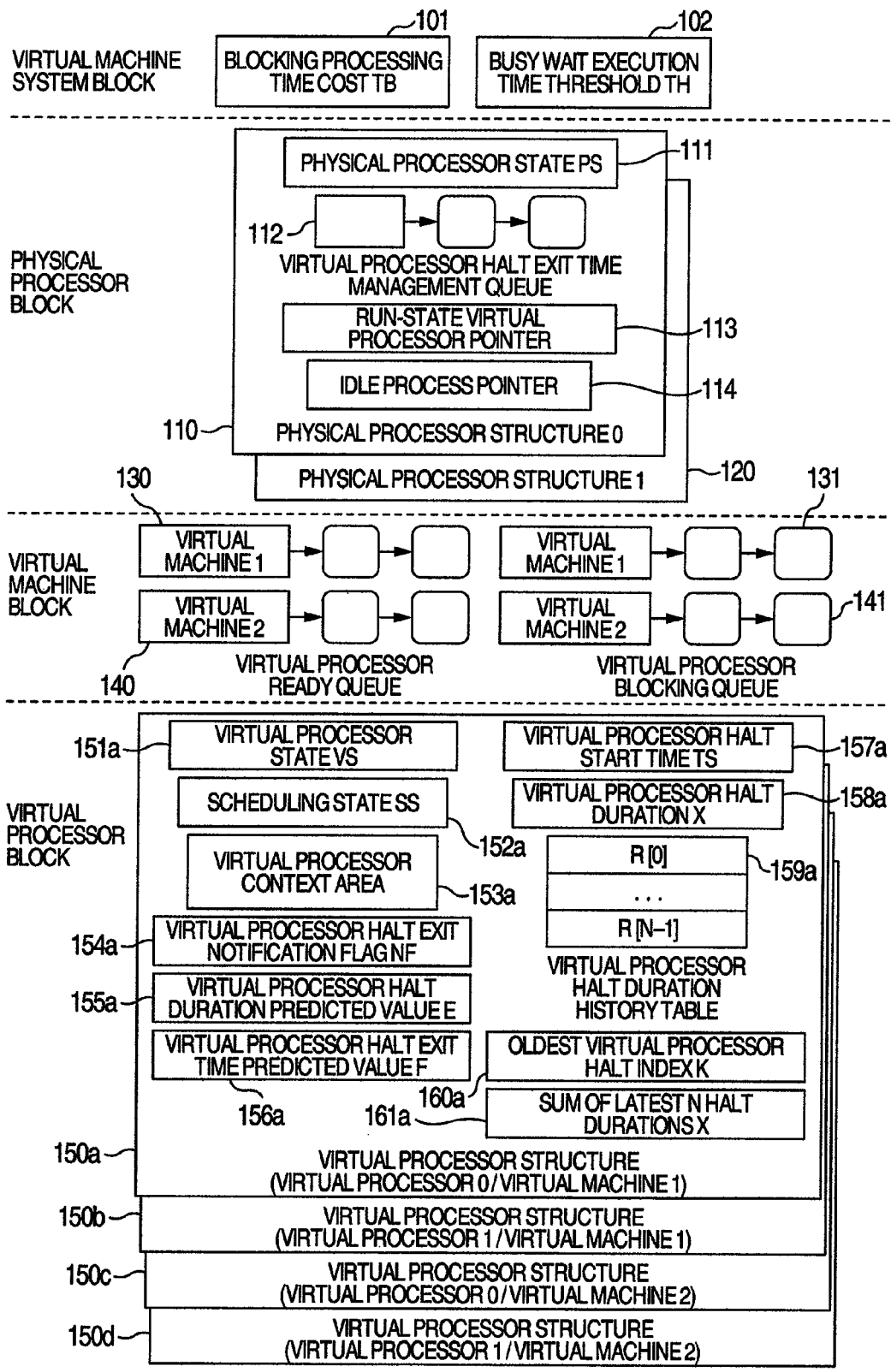
FIG. 3 is a configuration diagram of a virtual machine monitor in an embodiment of the invention.

FIG. 3 is a block diagram showing the outline of the virtual machine monitor 100 in this embodiment. Blocks of the virtual machine monitor 100 are classified into a virtual machine system block, a physical processor block, a virtual machine block and a virtual processor block.

The virtual machine monitor 100 has a blocking processing time cost TB (101) and a busy wait execution time threshold TH (102) for the virtual machine system.

The virtual machine monitor 100 has a physical processor structure 0 (110) and a physical processor structure 1 (120) corresponding to the physical processors respectively for the physical processors. The physical processor structure 0 (110) of the physical processor 0 (002a) has a physical processor state PS (111), a virtual processor halt exit time management queue 112 for managing a virtual processor halt exit time predicted value (which will be described later) in accordance with the physical processor, a run state virtual processor pointer 113 as a pointer to a virtual processor running on the physical processor, and an idle process pointer 114 as a pointer to an idle process associated with the physical processor. The physical processor structure 1 (120) of the physical processor 1 (002b) is the same as described above.

The virtual machine monitor 100 has virtual processor ready queues 130 and 140 and virtual processor block queues 131 and 141 in accordance with the virtual machines for the virtual machines.

The virtual machine monitor 100 has virtual processor structures 150a, 150b, 150c and 150d in accordance with the virtual processors. The virtual processor structure 150a has a virtual processor state VS (151a), a scheduling state SS (152a), a virtual processor context area 153a, a virtual processor halt exit notification flag NF (154a), a virtual processor halt duration predicted value E (155a), a virtual processor halt exit time predicted value F (156a), a virtual processor halt start time TS (157a), a virtual processor halt duration X (158a), a virtual processor halt duration history table R[i], i=0, 1, . . . , N−1 (159a) as an arrangement for storing the latest N virtual processor halt durations, an oldest virtual processor halt index K (160a) as an index in an entry of the virtual processor halt duration history table where the oldest virtual processor halt duration is stored, and a sum S (161a) of the latest N virtual processor halt durations. The virtual processor structures 150b, 150c and 150d are the same as described above.

The virtual processor scheduling method in this embodiment will be described based on the information described in FIGS. 1 and 3.

A virtual processor context switching method will be described first. The virtual processor 0 (202a) of the first virtual machine 200, the virtual processor 0 (302a) of the second virtual machine 300 and the physical processor 0 (002a) are taken as an example. Although the virtual processor context switching is not limited to continuous switching between virtual processors but may include the case where an idle process is interposed in such a manner that a virtual processor is switched to an idle process and an idle process is switched to a virtual processor, description of this case will be omitted because there is no difference in processing between the virtual processors.

Virtual processor context is a snapshot of processor register values of the virtual processor and virtual processor control information. The virtual processor context area 153a of the virtual processor structure 150a of the virtual processor 0 (202a) of the first virtual machine 200 holds a virtual processor context of the virtual processor. Although there are a plurality of active virtual processors in the virtual machine system, the hardware register of one physical processor is one surface. When the virtual processor 0 (202a) is running on the physical processor 0 (002a), the virtual machine monitor 100 holds the virtual processor context of the virtual processor 0 (202a) in the hardware register of the physical processor 0 (002a). When the virtual processor 0 (202a) is not running on the physical processor 0 (002a), the virtual machine monitor 100 holds the context of the virtual processor 0 (202a) in the virtual processor context area 153a.

When the virtual processor to be scheduled on the physical processor 0 (002a) need be switched from the virtual processor 0 (202a) of the first virtual machine 200 to the virtual processor 0 (302a) of the second virtual machine 300, the virtual machine monitor 100 first saves the virtual processor context of the virtual processor 0 (202a) of the first virtual machine 200 in the virtual processor context area 153a, and then loads the virtual processor context of the virtual processor 0 (302a) of the second virtual machine 300 from the virtual processor context area 153a to the physical processor 0 (002a). Then, the physical processor 0 (002a) resumes execution of the virtual processor 0 (302a) of the second virtual machine 300 from the loaded virtual processor context.

Switching of virtual processors by the virtual machine monitor 100 in the aforementioned hardware level is referred to as context switching. Context switching is a process large in processing time because there are a lot of virtual processor contexts different in kind for expressing respective processors entirely and because it is necessary to save and restore control data for a processor virtualization assisting function when the physical processor has the processor virtualization assisting function.

State information such as virtual processor state VS, virtual processor halt exit notification flag NF and scheduling state SS provided in accordance with each virtual processor and used for scheduling the virtual processor will be described. The virtual processor 0 (202a) of the first virtual machine 200 is taken as an example.

The virtual processor state VS (151a) takes the two values of virtual normal operating state VEXE and virtual halt state VHLT. The virtual machine monitor 100 enables execution of any program on the virtual processor 0 (202a) when the virtual processor 0 (202a) is in the virtual normal operating state VEXE, and disables execution of any program on the virtual processor 0 (202a) when the virtual processor 0 (202a) is in the virtual halt state VHLT. Switching of the virtual processor state VS (152a) from the virtual normal operating state VEXE to the virtual halt state VHLT and switching of the virtual processor state VS (152a) from the virtual halt state VHLT to the virtual normal operating state VOCE are both performed only on the physical processor when the virtual processor 0 (202a) is running on the physical processor.

The virtual processor halt exit notification flag NF (154a) is provided for synchronizing control of the virtual processor state VS (151a). The virtual processor halt exit notification flag NF (154a) takes the two value of true and false. Switching of the virtual processor halt exit notification flag NF (154a) from false to true is performed at an arbitrary time point asynchronously and independently of the operation of the virtual processor 0 (202a) on the physical processor. On the other hand, switching of the virtual processor halt exit notification flag NF (154a) from true to false is performed only on the physical processor when the virtual processor 0 (202a) is running on the physical processor.

The scheduling state SS (152*a*) takes the three values of run state RUN, ready state RDY and blocking state BLK. The run state RUN is a state where the virtual processor 0 (202*a*) is allocated to a physical processor and the physical processor is used. The ready state RDY is a state where the virtual processor 0 (202*a*) is enabled to be scheduled on a physical processor but the physical processor is not free so that the virtual processor 0 (202*a*) is waiting because another virtual processor is running on the physical processor. The blocking state BLK is a state where the virtual processor 0 (202*a*) is disabled from running until a specific event occurs even if the physical processor is free.

When the scheduling state SS (152*a*) of the virtual processor 0 (202*a*) indicates the run state RUN on the physical processor 0 (002*a*), the virtual machine monitor 100 manages the virtual processor based on the run-state virtual processor pointer 113 of the physical processor structure 0 (110) of the physical processor 0 (002*a*). On the other hand, when the scheduling state SS (152*a*) of the virtual processor 0 (202*a*) indicates either of the ready state RDY and the blocking state BLK, the virtual machine monitor 100 manages the virtual processor based on the virtual processor ready queue 130 and the virtual processor blocking queue 140 of the first virtual machine 200 to which the virtual processor belongs.

To schedule a virtual processor on the physical processor 0 (002*a*), the virtual machine monitor 100 removes one virtual processor from the virtual processor ready queue of any virtual machine in accordance with a predetermined algorithm and schedules the removed virtual processor on the physical processor 0 (002*a*). On this occasion, the virtual processor is pointed by the run-state virtual processor pointer 113 of the physical processor structure 110 of the physical processor 0 (002*a*).

Figure 4:
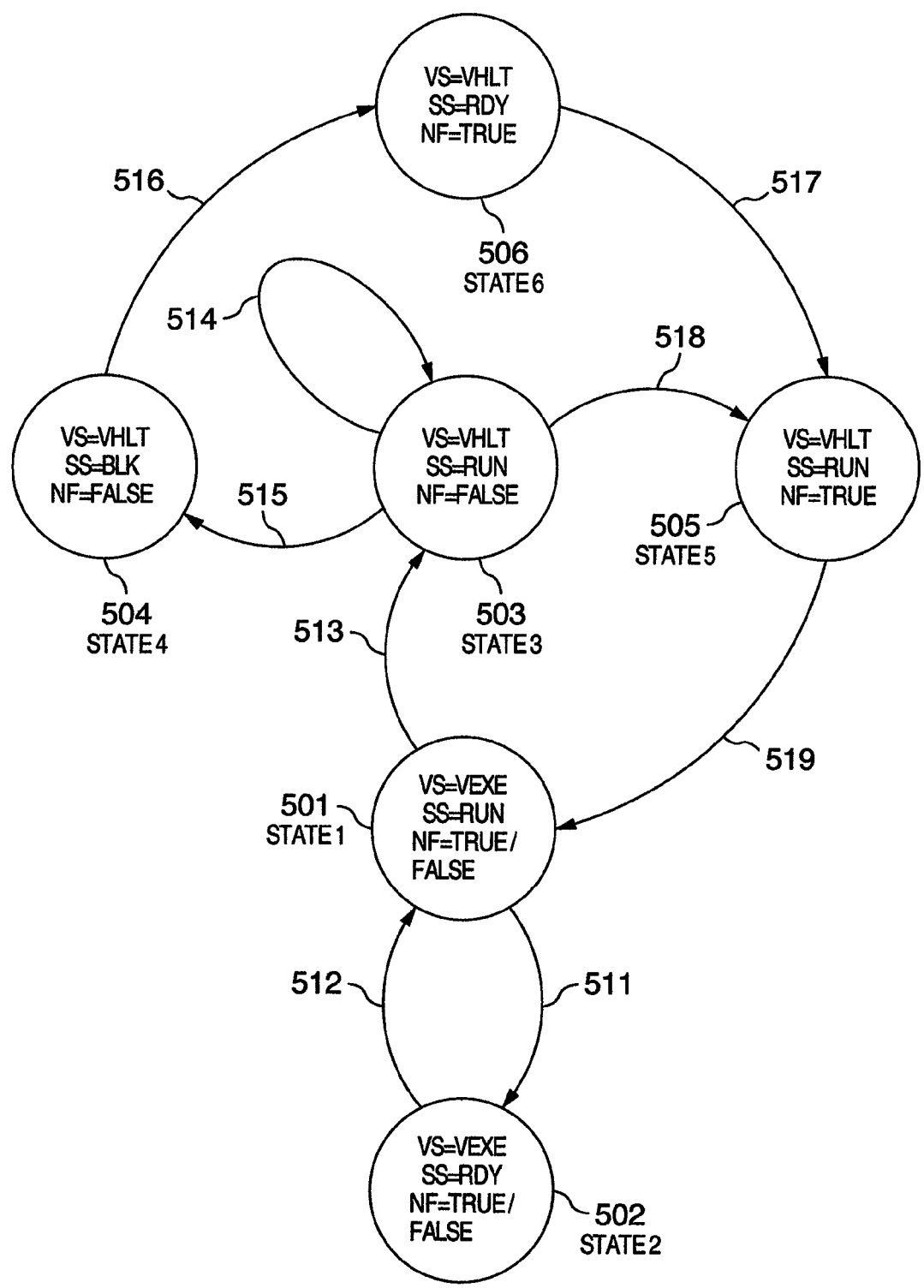
FIG. 4 is a state transition view concerned with a virtual processor state VS, a scheduling state SS and a virtual processor resume notification flag NF of a virtual processor.

State transition of a virtual processor in which the virtual processor state VS, the scheduling state SS and the virtual processor halt exit notification flag NF operate with one another will be described. FIG. 4 is a state transition view of the virtual processor.

To allocate a physical processor to a virtual processor and execute a program on the virtual processor, the virtual machine monitor 100 sets the virtual processor state VS of the virtual processor to indicate the run state RUN and sets the scheduling state SS to indicate the virtual normal operating state VOCE. The value of the virtual processor halt exit notification flag NF is no object (state 1 501).

Step 1 511 shows a process of switching the scheduling state SS to the ready state RDY while keeping the virtual processor state VS of the virtual processor to VEXE and inserting (state 2 502) the virtual processor in the virtual processor ready queue of a virtual machine to which the virtual processor belongs when the virtual processor in the state 1 501 has spent the time slice or when another higher-priority virtual processor appears.

Step 2 512 shows a process of removing a virtual processor from the virtual processor ready queue of a virtual machine to which the virtual processor belongs when the virtual processor in the state 2 502 is selected to be scheduled on a physical processor, registering the virtual processor in the run-state virtual processor pointer of the physical processor to which the virtual processor is allocated, switching the scheduling state SS to the run state RUN, and going back to the state 1 501.

Step 3 513 shows a process of switching (state 3 503) the virtual processor state VS to the virtual halt state VHLT without switching the scheduling state when the virtual processor in the state 1 501 receives a request to switch the virtual processor state VS to the virtual halt state VHLT.

Step 4 514 shows a process of performing repeated examination in the state 3 503 as to whether the virtual processor halt exit notification flag NF is set to be true when the virtual processor waits for virtual halt exit by a busy wait method which will be described later.

Step 5 515 shows a process of switching the scheduling state SS to the blocking state BLK and inserting (state 4 504) the virtual processor in the virtual processor blocking queue of a virtual machine to which the virtual processor belongs when the step 4 514 is interrupted or when the virtual processor waits for virtual halt exit by a blocking method which will be described later.

Step 8 518 shows a process of setting the virtual processor halt exit notification flag NF of the virtual processor to be true when the virtual processor in the state 3 503 exits from the virtual halt state.

Step 6 516 shows a process of setting the virtual processor halt exit notification flag NF of the virtual processor to be true, removing the virtual processor from the virtual processor blocking queue of a virtual machine to which the virtual processor belongs, switching the scheduling state SS to the ready state RDY, and inserting (state 6 506) the virtual processor in the virtual processor ready queue of the virtual machine when the virtual processor in the state 4 504 exits from the virtual halt state.

Step 7 517 shows a process of removing a virtual processor from the virtual processor ready queue of a virtual machine to which the virtual processor belongs when the virtual processor in the state 6 506 is selected to be scheduled on a physical processor, registering the removed virtual processor in the run-state virtual processor pointer of the physical processor on which the virtual processor is scheduled, and transiting to the state 5 505.

Step 9 519 shows a process of detecting that the virtual processor halt exit notification flag NF of the virtual processor in the state 5 505 is true, changing the flag to false, switching the virtual processor state VS to VEXE, and going back to the state 1 501.

Among the steps 1 511 to 9 519, steps 1 511, 3 513, 4 514, 5 515, 8 518 and 9 519 are performed on a physical processor in synchronization with a virtual processor when the virtual processor is running on the physical processor. Steps 2 512, 6 516 and 7 517 are performed at any time point asynchronously and independently of the operation of the virtual processor on the physical processor.

Switching between the virtual halt state and the virtual normal operating state of a virtual processor inclusive of scheduling and synchronization of the virtual processor will be described. Switching between the virtual halt state and the virtual normal operating state of a virtual processor is composed of the two processes of a virtual processor halt exit wait process and a virtual processor halt exit notification process.

Figure 5:
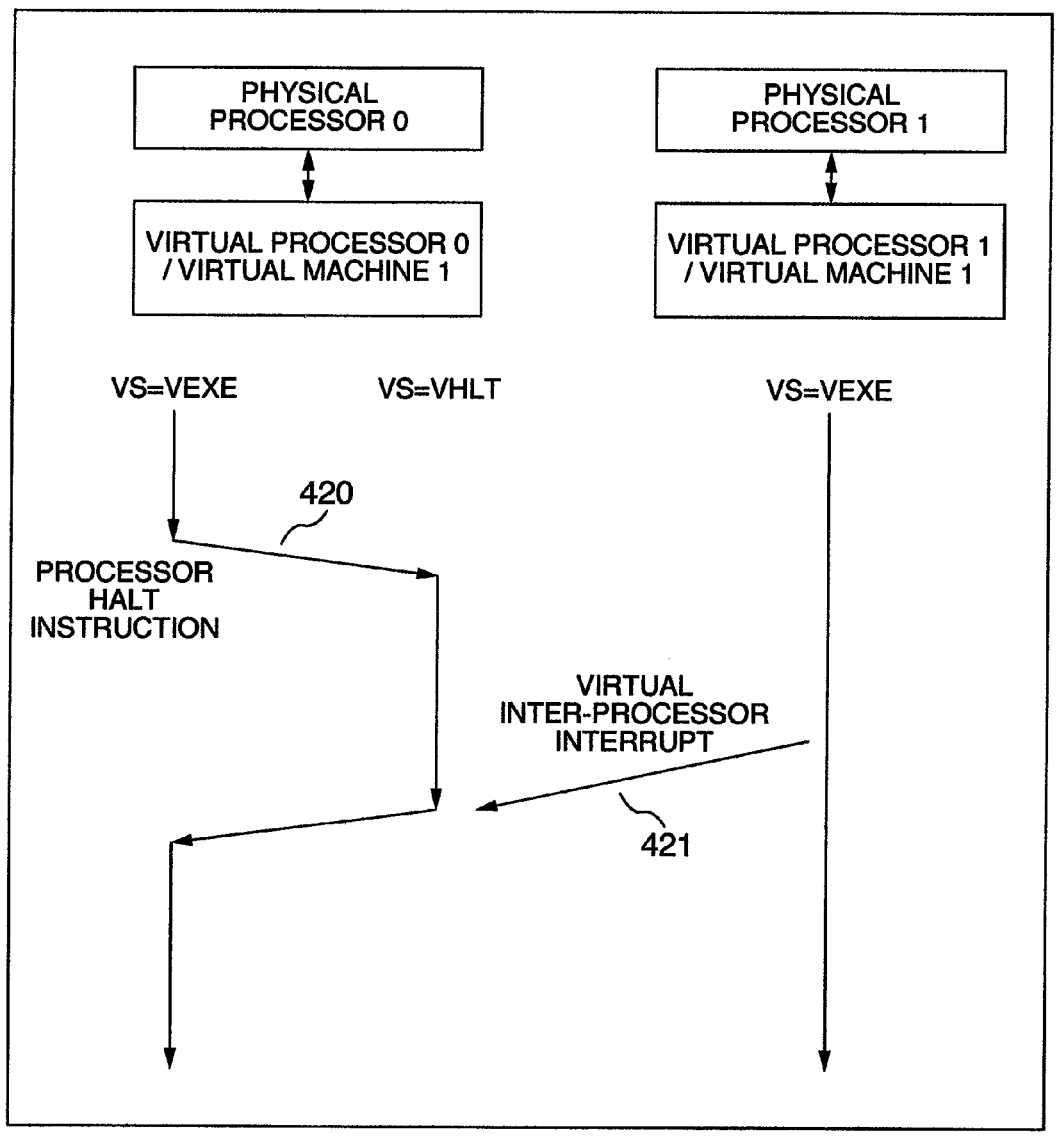
FIG. 5 is a conceptual view showing an example of a virtual processor halt process in an embodiment of the invention.

The virtual processor halt exit wait process and the virtual processor halt exit notification process will be described while switching between the virtual halt state and the virtual normal operating state in the virtual processor 0 (202*a*) of the first virtual machine 200 in time sequence as shown in FIG. 5 is taken as an example.

Contents of FIG. 5 will be described in brief. The virtual processor 0 (202*a*) and the virtual processor 1 (202*b*) of the first virtual machine 200 are running on the physical processor 0 (002*a*) and the physical processor 1 (002*b*) respectively. The virtual processor 0 (302*a*) and the virtual processor 1 (302*b*) of the second virtual machine 300 are both in the virtual halt state, that is, not allocated any physical processors. The virtual processor 0 (302*a*) and the virtual processor 1 (302*b*) are not shown in FIG. 5 for the sake of simplification of description.

When a program on the virtual processor 0 (202*a*) issues a request to switch the virtual processor state to the halt state, the virtual machine monitor 100 detects the request without direct hardware execution, switches the virtual processor state to the halt state, and suspends execution of the program on the virtual processor 0 (202*a*). When a program on the virtual processor 1 (202*b*) issues a virtual inter-processor interrupt to the virtual processor 0 (202*a*), the virtual machine monitor 100 detects the interrupt to achieve the interrupt operation virtually and switches the virtual processor state of the virtual processor 0 (202*a*) to the virtual normal operating state to resume execution of the program on the virtual processor 0 (202*a*).

Figure 6:
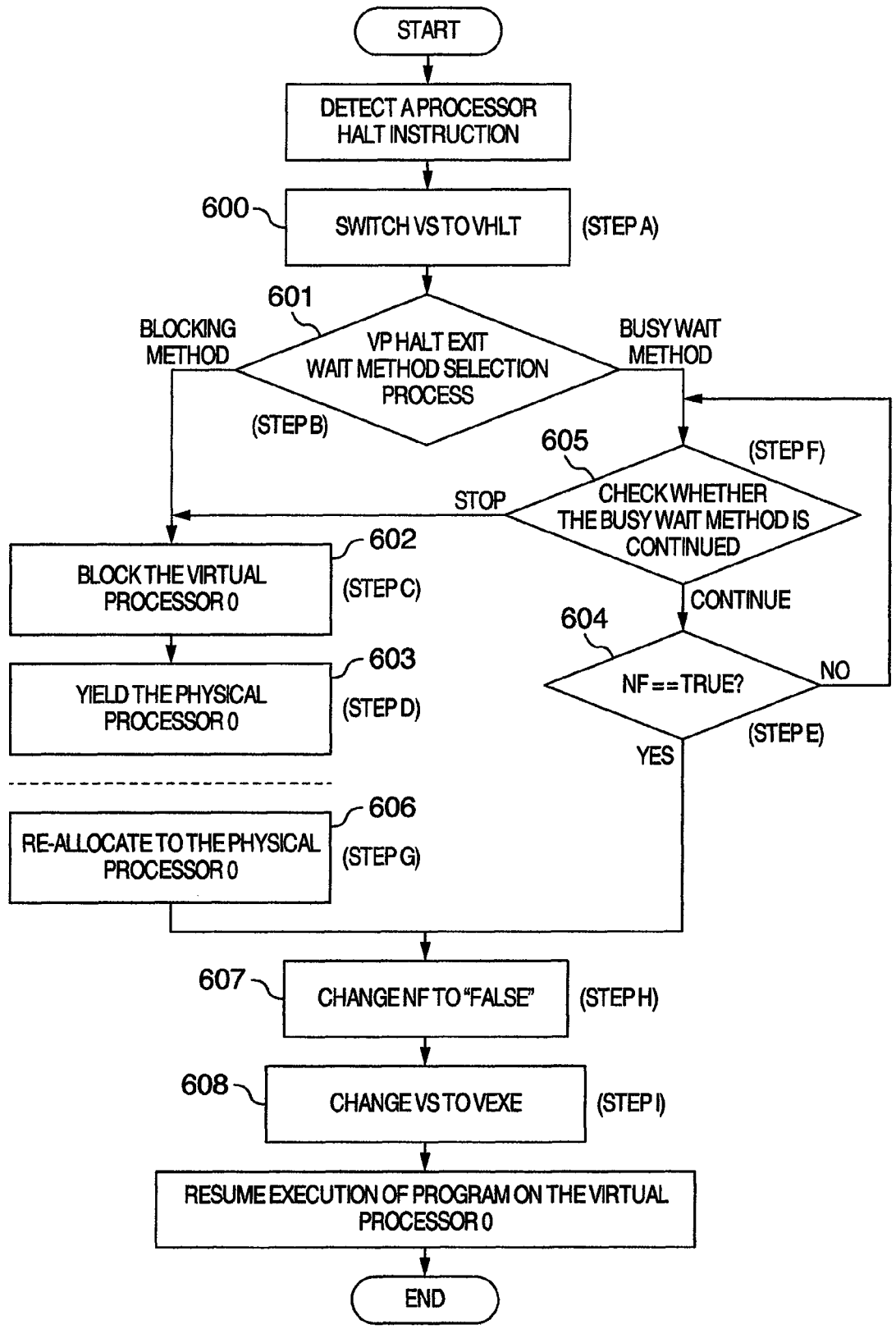
FIG. 6 is a flow chart of a virtual processor resume wait process.

FIG. 6 is a flow chart of the virtual processor halt exit wait process. The virtual processor halt exit wait process will be described along the example of FIG. 5 in accordance with the flow chart of FIG. 6.

Assume that the virtual processor 0 (202*a*) and the virtual processor 1 (202*b*) are both in the state 1 501. When a program on the virtual processor 0 (202*a*) issues a request to switch the virtual processor state to the halt state, the virtual machine monitor 100 detects the request without direct hardware execution, and switches the virtual processor state VS (151*a*) to the virtual halt state VHLT (step A 600).

When the blocking method is selected (step B 601) as the virtual processor halt exit wait process of the virtual processor 0 by a virtual processor halt exit wait method selection process which will be described later, the virtual machine monitor 100 switches the scheduling state SS to BLK, inserts the virtual processor 0 (202*a*) in the virtual processor blocking queue 131 of the first virtual machine 200 (step C 602), and executes context switching (step D 603) to yield the physical processor 0 (002*a*).

Because the virtual processor to be allocated to the physical processor 0 (002*a*) is not found, the virtual machine monitor 100 executes an idle process pointed by the idle process pointer 114 of the physical processor structure 0 (110) of the physical processor 0 (002*a*).

On the other hand, when the busy wait method is selected (step B 601) by a virtual processor halt exit wait method selection process which will be described later, the virtual machine monitor 100 performs repeated examination until the virtual processor halt exit notification flag NF (154*a*) is true (step E 604). When the busy wait method is interrupted (step F 605) by a busy wait method continuation check process (which will be described later) before it is confirmed that the virtual processor halt exit notification flag NF (154*a*) is set to be true, the steps C 602 and D 603 are executed to yield the physical processor 0 (002*a*) in the same manner as the blocking method is selected at first.

When the busy wait method is selected and it is confirmed by the virtual processor halt exit notification process (which will be described later) in the step E 604 that the virtual processor halt exit notification flag NF (154*a*) is set to be true, the virtual machine monitor 100 sets the virtual processor halt exit notification flag NF (154*a*) to false (step H 607), and switches the virtual processor state VS (151*a*) to the virtual normal operating state VEXE (step I 608) to resume execution of the program on the virtual processor 0 (202*a*).

When the blocking method is selected, the virtual processor is woken up by the virtual processor halt exit notification process which will be described later. When the virtual processor is selected to be scheduled on the physical processor 0 (002*a*) and context switching is performed to resume execution of the program on the physical processor 0 (002*a*) (step G 606), the virtual machine monitor 100 sets the virtual processor halt exit notification flag NF (154*a*) to false (step H 607) and switches the virtual processor state VS (151*a*) to the virtual normal operating state VEXE (step I 608) to resume execution of the program on the virtual processor 0 (202*a*).

FIG. 7 is a flow chart of the virtual processor halt exit notification process. The virtual processor halt exit notification process will be described next.

When the virtual processor 1 (202*b*) issues a virtual inter-processor interrupt to the virtual processor 0 (202*a*), the virtual machine monitor 100 detects the external interrupt being issued and performs the external interrupt operation virtually. Then, the virtual processor halt exit notification process starts. The virtual processor halt exit notification flag NF (154*a*) is set to be true regardless of the virtual processor state (step J 609). When the scheduling state SS (152*a*) of the virtual processor 0 (202*a*) is BLK (step K 610), the virtual processor 0 (202*a*) is removed from the virtual processor blocking queue 131 of the first virtual machine 200, the scheduling state SS (152*a*) is switched to the ready state RDY, and the virtual processor 0 (202*a*) is inserted in the virtual processor ready queue 130 of the first virtual machine 200 (step L 611).

When the scheduling state SS (152*a*) of the virtual processor 0 (202*a*) is other than the blocking state BLK, that is, when the scheduling state SS (152*a*) is the run state RUN or the ready state RDY, there is nothing to do after that. When the virtual processor 0 (202*a*) is selected to be scheduled on the physical processor 0 (002*a*), the virtual machine monitor 100 switches the scheduling state SS (152*a*) to the run state RUN, restores the virtual processor context of the virtual processor 0 (202*a*) to the physical processor 0 (002*a*), and resumes the virtual processor 0 (202*a*) (step G 606).

The difference in performance and processing cost between the blocking method and the busy wait method will be considered based on the example of FIG. 5. Performance is evaluated based on the value of virtual processor halt exit latency. Processing cost is evaluated based on the remaining processor capacity which is the ratio of processor time the physical processor can be used except controlling the halt of the virtual processor in a time range of from a time point that the virtual processor begins to wait for halt exit to a time point that execution of the program on the virtual processor is resumed.

The size of each processing time cost in a range of from the step A 600 to the step L 611 in FIGS. 6 and 7 is as follows.

Step A cost, step B cost, step F cost, step G cost, step H cost, step I cost<<step C cost, step D cost, step E cost, step J cost, step K cost Step D 603 and step K 610 are both very large in processing time because of the context switching processes. Step C 602 and step J 609 are small in processing time compared with the context switching processes but large in processing time because of the queue operating processes. Although there is a possibility that step E 604 may be largest in processing time because of the bust wait process, whether the step E 604 is cost is determined by whether there is another process to be scheduled during the step E 604. The remaining step A 600, step B 601, step F 605, step G 606, step H 607 and step I 608 are very small in processing time in view of total processing time because of the bit referring/operating processes.

Figure 8A:
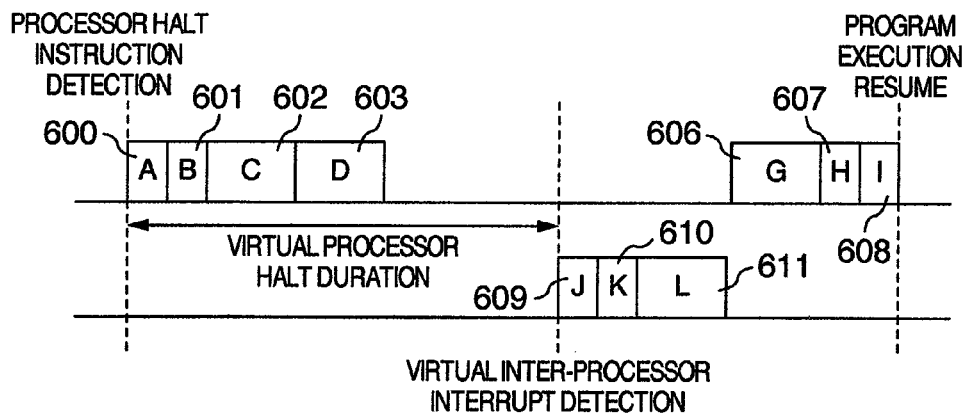
FIGS. 8A to 8C are conceptual views showing a flow of the virtual processor resume wait process and the virtual processor resume notification process in time sequence.
Figure 8B:
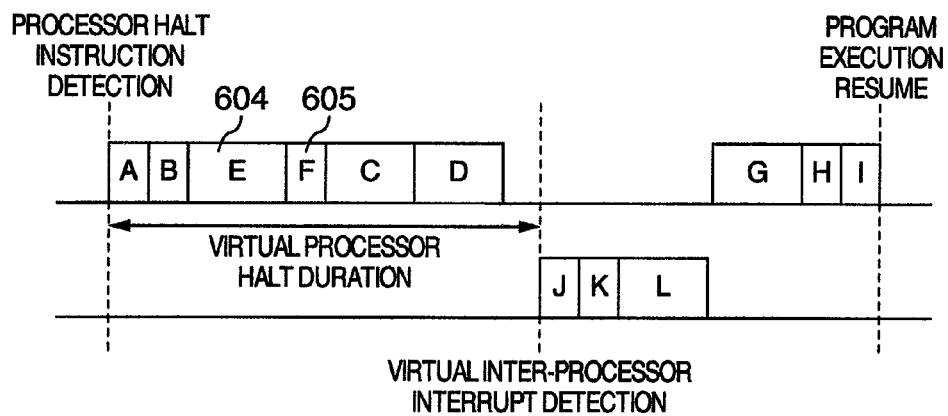
Figure 8C:
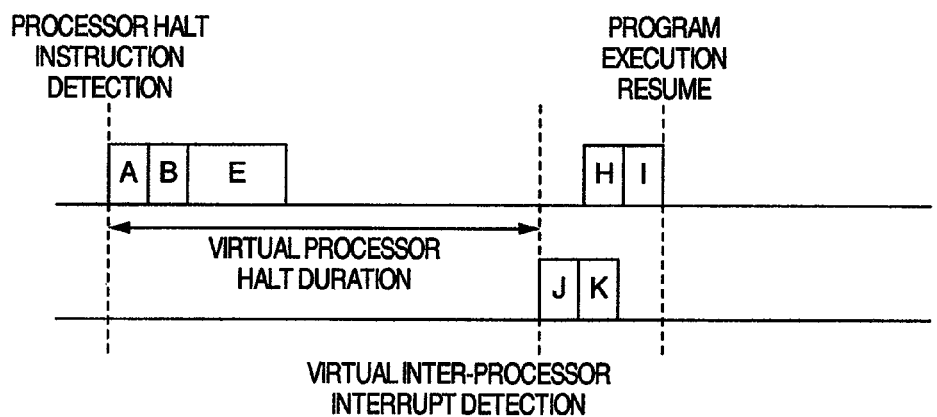

FIG. 8A shows the virtual processor halt exit wait process and the virtual processor halt exit notification process in time sequence in the case where the blocking method is selected. FIG. 8B shows the virtual processor halt exit wait process and the virtual processor halt exit notification process in time sequence in the case where the busy wait method is selected but changed to the blocking method in the middle of the busy wait method. FIG. 8C shows the virtual processor halt exit wait process and the virtual processor halt exit notification process in time sequence in the case where the busy wait method is selected. The virtual processor halt exit latency and the remaining processor capacity of the physical processor 0 in each case will be described. The following description will be simplified in such a manner that step A cost is referred to as A like FIGS. 8A to 8C.

The virtual processor halt exit wait latency and the remaining processor capacity in the case where the blocking method is selected as shown in FIG. 8A are as follows.

Blocking vertical processor halt exit latency=$(H+I+J)+(K+G)$

Remaining processor capacity of the blocking physical processor $0=(VP\ halt\ duration-(A+B+C+D)+(H+I+J))/(VP\ halt\ duration+(H+I+J)+(K+G))$ The virtual processor halt exit wait latency and the remaining processor capacity in the case where the busy wait method is selected as shown in FIG. 8B but changed to the blocking method in the middle of the busy wait method are as follows.

Busy wait→blocking virtual processor halt exit latency=$(H+I+J)+(K+G)$

Busy wait→remaining processor capacity of blocking physical processor $0=(VP\ halt\ duration-(A+B+E+F+C+D)+(H+I+J))/(VP\ halt\ duration+(H+I+J)+(K+G))$ The virtual processor halt exit wait latency and the remaining processor capacity in the case where the busy wait method is selected as shown in FIG. 8C are as follows.

Busy wait virtual processor halt exit latency=$H+(K+G)$

Remaining processor capacity of busy wait physical processor $0=0$

The values of the virtual processor halt exit latency are compared as follows.

Busy wait<<blocking=(busy wait→blocking)

The values of the remaining processor capacity are compared as follows.

0=busy wait<<(busy wait→blocking)<blocking

The blocking method is a method which is highest in remaining processor capacity, that is, which is high in physical processor utilization ratio. The busy wait method is smallest in virtual processor halt exit latency and superior in performance. In the busy wait method, it is impossible to use the physical processor for other purposes because the remaining processor capacity is 0 but it is possible to reduce power consumption when the physical processor is halted during execution of the busy wait. Accordingly, when there is no other virtual processor to be operated, there is no issue. When the busy wait method is stopped and changed to the blocking method in the middle, the remaining processor capacity is low compared with the case where the blocking method is selected at first, but the virtual processor halt exit latency is the same as that in the case where the blocking method is selected at first. Switching from the busy wait method to the blocking method in the middle has to be avoided.

From above description, a policy of the virtual processor halt exit wait method selection process is decided in such a manner that the blocking method is selected when a high processor utilization ratio is required, the busy wait method is selected when there is no other virtual processor to run and a small value of virtual processor halt exit latency is required, and switching from the busy wait method to the blocking method in the middle has to be avoided.

A calculation method and a management method which are used for achieving this policy and which calculate the virtual processor halt duration, the virtual processor halt duration predicted value and the virtual processor halt exit time predicted value and manage these values will be described next. The virtual processor 0 (202*a*) of the first virtual machine 200 is taken as an example.

The virtual processor halt duration of the virtual processor 0 (202*a*) is defined as a time range of from the start of waiting for setting of the virtual processor halt exit notification flag NF (154*a*) of the virtual processor 0 (202*a*) to be true to the completion of setting of the virtual processor halt exit notification flag NF to be true. An average of latest N virtual processor halt durations is defined as a virtual processor halt duration predicted value.

Figure 9A:
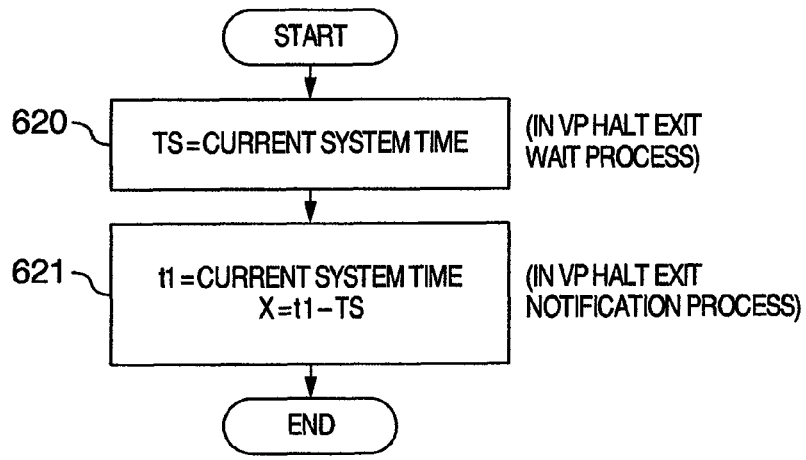
FIGS. 9A to 9C are flow charts showing a virtual processor halt duration, a predicted value calculation process and a management process concerned with the duration.

A method of calculating the virtual processor halt duration X of the virtual processor 0 will be described based on the flow chart of FIG. 9A.

In the virtual processor halt exit wait process, the system time is held in the virtual processor halt start time TS (157*a*) of the virtual processor 0 (202*a*) just before the virtual processor 0 (202*a*) begins to wait for setting the virtual processor halt exit notification flag NF (154*a*) of the virtual processor 0 (202*a*) to be true after the virtual processor state VS (151*a*) of the virtual processor 0 (202*a*) is switched to the virtual halt state VHLT (step 620).

In the virtual processor halt exit wait process, the processor halt duration t1-TS of the virtual processor 0 (202*a*) is calculated by subtracting the held virtual processor halt start time TS (157*a*) from the system time t1 just after the virtual processor halt exit notification flag NF (154*a*) of the virtual processor 0 (202*a*) is set to be true, and the calculated processor halt duration t1-TS is held in the virtual processor halt duration X (158*a*) (step 621).

Figure 9B:
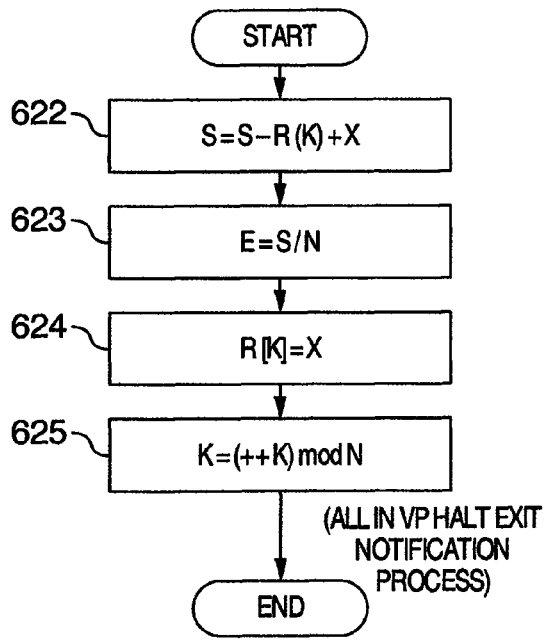
Figure 10:
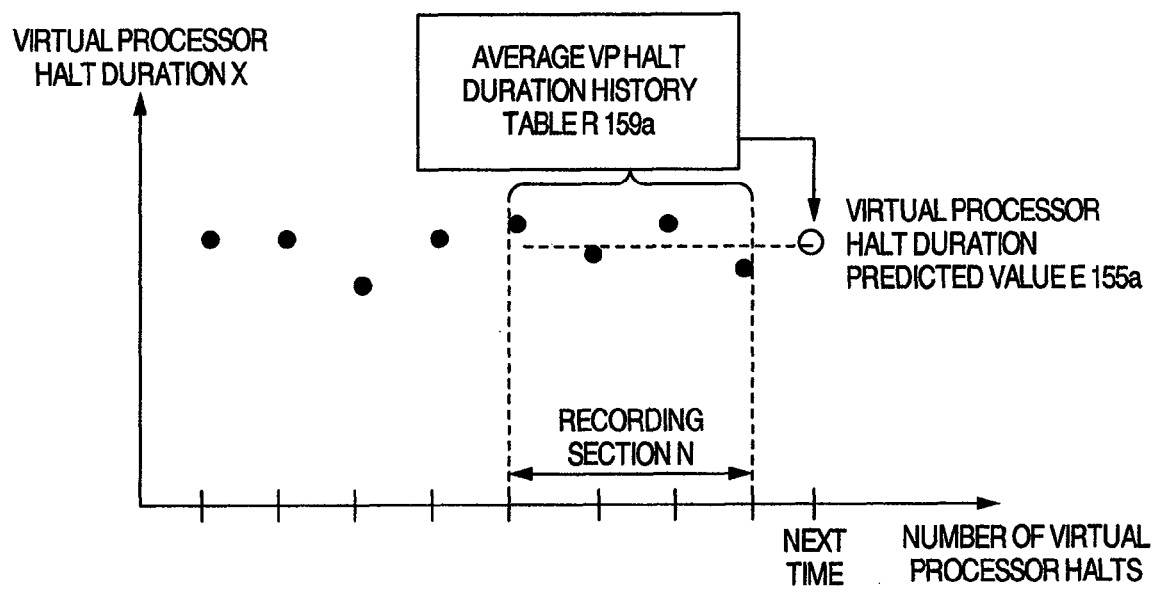
FIG. 10 is a conceptual view showing the relation between the virtual processor halt duration predicted value and the virtual processor halt duration.

A method of calculating the virtual processor halt duration predicted value E (155*a*) of the virtual processor 0 (202*a*) will be described based on the flow chart of FIG. 9B. FIG. 10 is a conceptual view showing the method of calculating the virtual processor halt duration predicted value E (155*a*).

Calculation of the virtual processor halt duration predicted value E (155*a*) is performed in the virtual processor halt exit notification process so as to follow calculation of the virtual processor halt duration X (158*a*).

In the virtual processor halt exit notification process, the sum S (161*a*) of latest N virtual processor halt durations is updated based on the calculated virtual processor halt duration X (158*a*). Because the oldest virtual processor halt index K (160*a*) indicates the oldest virtual processor halt duration in the virtual processor halt duration history table R[i], i=0, 1, . . . , N−1 159*a*, the calculated virtual processor halt duration X (158*a*) is added to a value obtained by subtracting the oldest virtual processor halt duration R[K] from the sum S (161*a*) of latest N virtual processor halt durations to thereby update the sum S (161*a*) of latest N virtual processor halt durations, that is, the following equation 1 is calculated (step 622).

$$Snew = Sold - R[K] + X \qquad \text{(Equation 1)}$$

The updated sum S of latest N virtual processor halt durations is divided by N to thereby calculate an average of latest N virtual processor halt durations as the next virtual processor halt duration predicted value E (155*a*), that is, the following equation 2 is calculated (step 623).

$$E = S/N \qquad \text{(Equation 2)}$$

Finally, the virtual processor halt duration history table R[i], i=0, 1, . . . , N−1 159*a* is updated. The latest virtual processor halt duration X (157*a*) is held in an entry R[K] of the virtual processor halt duration history table designated by the oldest virtual processor halt index K (160*a*), that is, the following equation 3 is calculated (step 624).

$$R[K]=X \qquad \text{(Equation 3)}$$

The oldest virtual processor halt index K is increased by +1 and K is set to be equal to 0 if K becomes equal to N, that is, the following equation 4 is calculated (step 625).

$$K=(++K) \bmod N \qquad \text{(Equation 4)}$$

As is obvious from the expressions 1, 2, 3 and 4, the virtual processor halt duration predicted value E (155*a*) can be calculated in a constant processing time with use of only information of the virtual processor 0 without necessity of re-calculating the sum of latest N virtual processor halt durations.

Figure 9C:
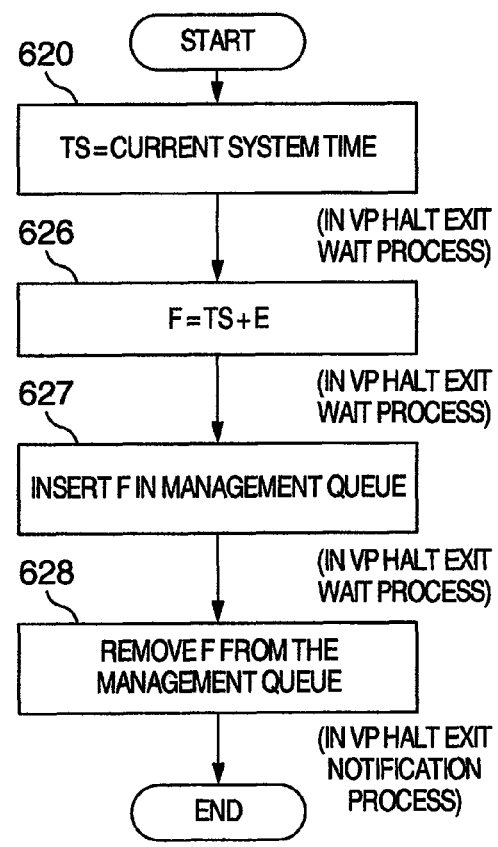

A method of calculating the virtual processor halt exit time predicted value F (156*a*) of the virtual processor 0 (202*a*) and a method of managing the virtual processor halt exit time predicted value F (156*a*) will be described based on the flow chart of FIG. 9C. Assume that the virtual processor 0 (202*a*) of the first virtual machine 200 runs on the physical processor 0 (002*a*).

In the virtual processor halt exit wait process, after the system time t0 is held in the virtual processor halt start time TS (157*a*) just before the virtual processor 0 (202*a*) begins to wait for setting the virtual processor halt exit notification flag NF (154*a*) of the virtual processor 0 (202*a*) to be true after the virtual processor state VS (152*a*) of the virtual processor 0 (202*a*) is switched to the virtual halt state VHLT, the virtual processor halt duration predicted value E (155*a*) is added to the time TS to thereby calculate the virtual processor halt exit time predicted value F (156*a*) in accordance with the following equation 5 (step 626).

$$F=TS+E \qquad \text{(Equation 5)}$$

The calculated virtual processor halt exit time predicted value F (156*a*) is inserted in the appropriate position of the virtual processor halt exit time management queue 112 of the currently operating physical processor 0 (002*a*) (step 627). When the virtual processor 0 (202*a*) detects that the virtual processor halt exit notification flag NF (154*a*) is set to be true, the virtual processor 0 (202*a*) removes the virtual processor halt exit time predicted value F (156*a*) from the virtual processor halt exit time management queue 112 of the physical processor 0 (002*a*) (step 628).

The reason why the virtual processor halt duration predicted value is used in the virtual processor scheduling method according to the invention will be described.

As described above, the case where a general purpose operating system halts a processor is classified into the case where the processor is idle and the case where the processor waits for an event under work load execution. The processor halt period and the processor halt duration in the case where the processor waits for a synchronization event under work load execution are both very short compared with the case where the processor is idle. As a common point, the processor halt duration in the case where the processor waits for a synchronization event under work load execution and the processor halt duration in the case where the processor is idle steadily take almost constant values respectively.

The things to be done by the virtual machine monitor 100 are decision as to whether the halt of the virtual processor is caused by waiting for a synchronization event under work load execution or not, and prediction of the virtual processor halt exit time.

Processor utilization ratio is information for understanding the operation of the virtual processor. Under such a work load that waiting for a synchronization event occurs frequently, switching of the virtual processor between the virtual halt state and the virtual normal operating state occurs frequently but the virtual processor utilization ratio per se may be low. In this case, whether the halt of the virtual processor is caused by waiting for an event under work load execution cannot be decided based on the processor utilization ratio. Moreover, the virtual processor halt exit time cannot be predicted based on the information of the processor utilization ratio.

On the contrary, the processor halt duration under such work load execution that waiting for a synchronization event occurs frequently is characterized by taking a almost constant and very small value steadily. When the processor utilization ratio is characterized as described above, the next processor halt duration becomes almost equal to the average of latest processor halt durations. That is, when the average of latest processor halt durations is calculated, the average can be used as a predicted value of the next processor halt duration.

The average of latest processor halt durations can be calculated in such a manner that the oldest processor halt duration is subtracted and the newest processor halt duration is added, without necessity of re-calculating the sum. The problem in the case where the processor utilization ratio is used can be eliminated. Even if the prediction is wrong, the halt duration is negligibly small compared with the work load execution time because the processing time for context switching of the virtual processor becomes only twice at maximum. Moreover, the virtual processor halt exit time predicted value can be calculated easily in such a manner that the virtual processor halt duration predicted value of the virtual processor is added to the current system time when the virtual processor begins to be halted. Accordingly, in the virtual processor scheduling method according to the invention, the virtual processor halt duration predicted value is used.

The virtual processor halt exit wait method selection process and the busy wait method continuation check process for achieving the aforementioned policy by use of information of the virtual processor halt duration will be described. The case where the virtual processor 0 of the first virtual machine operates on the physical processor 0 is taken as an example.

In the following description, a blocking processing time cost TB (101) and a busy wait execution time threshold TH (102) are used as threshold information. The processing time in the case where the blocking method is applied but the virtual processor is waked immediately without any wait time is calculated in advance and the calculated value is set in the blocking processing time cost TB (101). That is, the total value of the steps A, B, C, D, H, I, J, K and G is calculated in advance and set. The busy wait execution time threshold TH (102) is set as a value for discriminating between the case where the virtual processor halt exit latency needs to take a small value and the case where the virtual processor halt exit latency need not take a small value. In an embodiment, the busy wait execution time threshold TH (102) is set to be 200 micro-seconds.

Figure 13A:
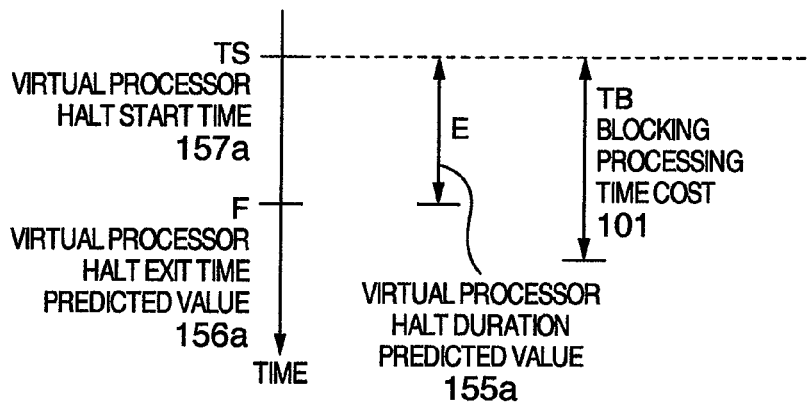
FIGS. 13A to 13C are conceptual views showing the relation between variables in respective condition decisions of the virtual processor resume wait method selection process.
Figure 13B:
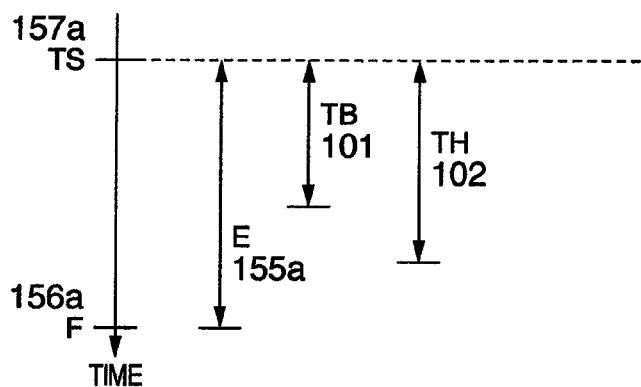
Figure 13C:
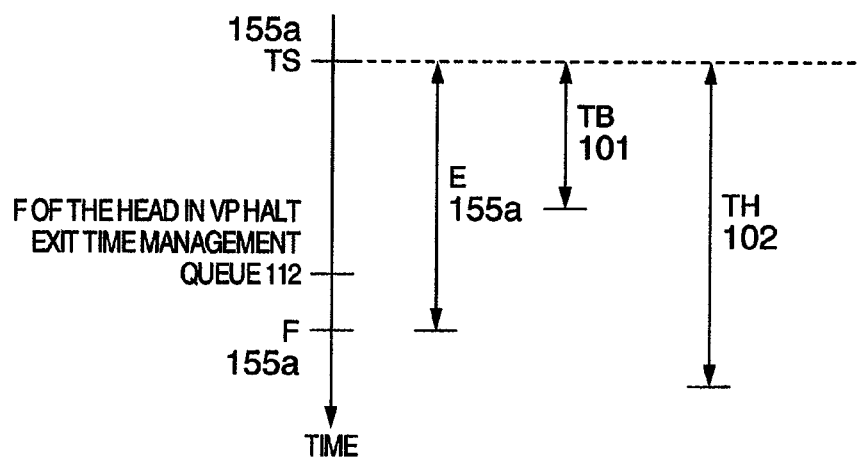

First, condition decisions in the virtual processor halt exit wait method selection process will be described one by one successively. The condition decisions will be described with reference to FIGS. 13A to 13C which exemplify meanings of conditions respectively. In the same manner as described above, the case where the virtual processor 0 (202*a*) of the first virtual machine 200 runs on the physical processor 0 (002a) is taken as an example.

When the virtual processor halt duration predicted value E (155a) of the virtual processor 0 (202a) is smaller than the predetermined blocking processing time cost TB (101), the busy wait method is selected regardless of whether there is any virtual processor enabled to be allocated to the currently operating physical processor 0 (002a) or not. In this case, it is preferable from the two view points of processor utilization ratio and performance that the busy wait method is applied because the halt duration of the virtual processor 0 (202a) is smaller than the blocking processing time cost TB (101) (see FIG. 13A).

When the virtual processor halt duration predicted value E (155a) of the virtual processor 0 (202a) is not smaller than the predetermined blocking processing time cost TB (101) and there is any virtual processor enabled to be scheduled on the physical processor 0 (002a), the blocking method is selected. In this case, the blocking method is selected because the processor utilization ratio is lowered if the busy wait method is applied to the virtual processor 0 (002a).

When the virtual processor halt duration predicted value E (155a) of the virtual processor 0 (202a) is not smaller than the predetermined busy wait execution time threshold TH (102), the blocking method is selected. In this case, the blocking method is selected to eliminate the risk of lowering the processor utilization ratio because there is a situation that the first general purpose operating system 201 on the virtual processor 0 (202a) does not require the small value of virtual processor halt exit latency (see FIG. 13B).

When the virtual processor halt duration predicted value E (155a) of the virtual processor 0 (202a) is not smaller than the blocking processing time cost TB (101) but smaller than the busy wait execution time threshold TH (102) and there is no virtual processor enabled to be scheduled on the physical processor 0 (002a) and the virtual processor halt exit time predicted value F (156a) of the virtual processor is not smaller than the virtual processor halt exit time F of the head of the virtual processor halt exit time management queue 112 of the virtual processor, the blocking method is selected. In this case, though there is no other virtual processor enabled to be scheduled on the physical processor just after the virtual processor 0 (202a) yields the physical processor 0 (002a), the other virtual processor exits from the halt state before the virtual processor 0 (202a) exits from the halt state. Accordingly, if the virtual processor 0 (202a) stays on the physical processor 0 (002a), context switching of the virtual processor 0 (202a) is delayed, so that resume of a program on the other virtual processor to run in place of the virtual processor 0 (202a) is delayed. Therefore, the blocking method is selected (see FIG. 13C).

When the virtual processor halt duration predicted value E (155a) of the virtual processor 0 (202a) is not smaller than the blocking processing time cost TB (101) but smaller than the busy wait execution time threshold TH (102) and there is no virtual processor enabled to be allocated to the physical processor 0 (002a) and the virtual processor halt exit time predicted value F (156a) of the virtual processor 0 (202a) is smaller than the virtual processor halt exit time predicted value F of the head of the virtual processor halt exit time management queue 112 of the virtual processor 0 (202a), the busy wait method is selected.

Figure 11:
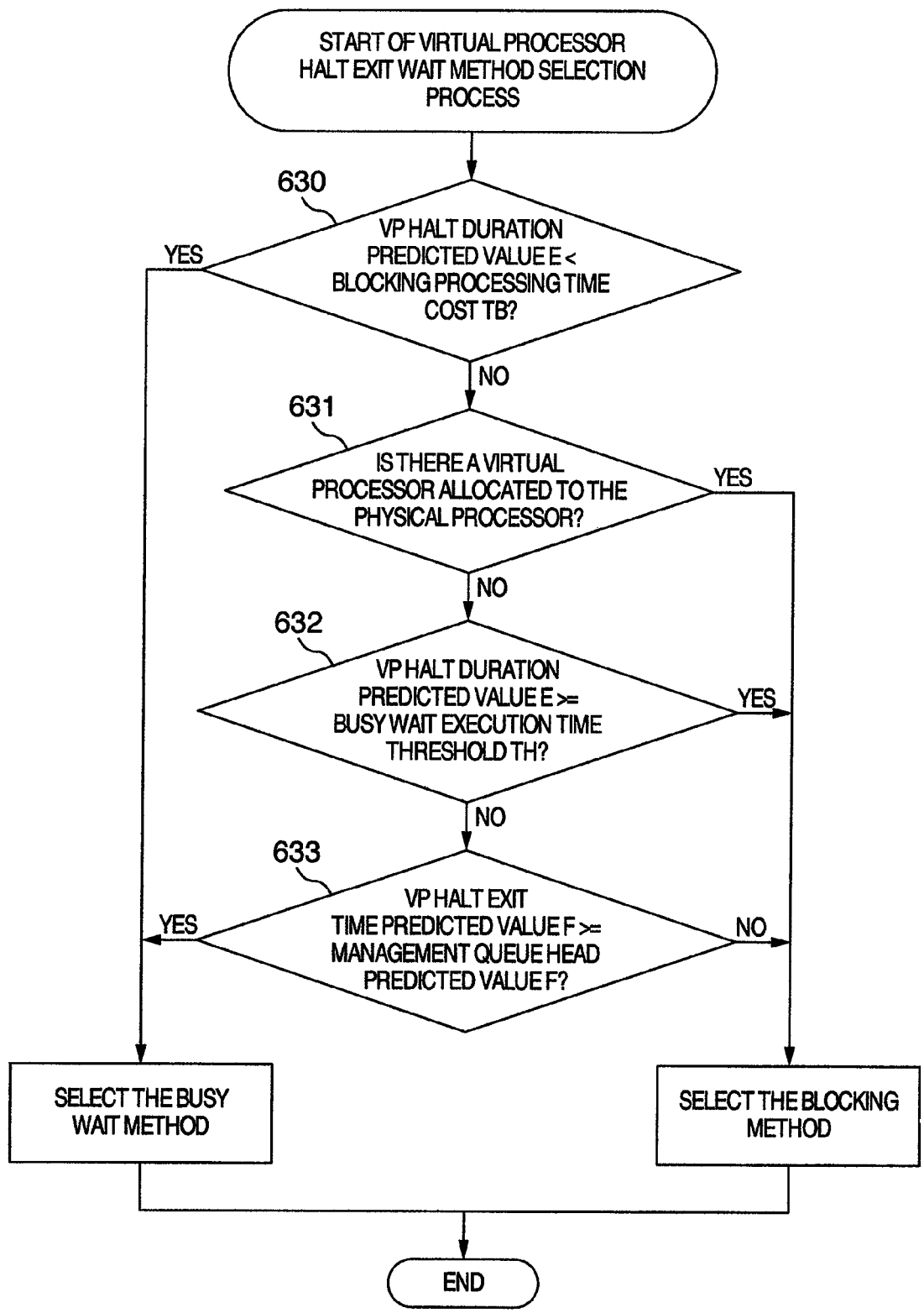
FIG. 11 is a flow chart of a virtual processor resume wait method selection process.

FIG. 11 is a flow chart of the virtual processor halt exit wait method selection process of the virtual processor. The case where the virtual processor 0 (202a) of the first virtual machine 200 operates on the physical processor 0 (002a) is taken as an example.

First, if E<TB (step 630), the busy wait method is selected. Otherwise, processing goes to the next condition decision. If there is any other virtual processor enabled to be dispatched on the currently operating physical processor 0 (002a) (step 631), the blocking method is selected. Otherwise, processing goes to the next condition decision. If E>=TH (step 632), the blocking method is selected. Otherwise, processing goes to the next condition decision. If F<the virtual processor halt exit time F of the head of the virtual processor halt exit time management queue 112 (step 633), the busy wait method is selected. Otherwise, the blocking method is selected.

Figure 12:
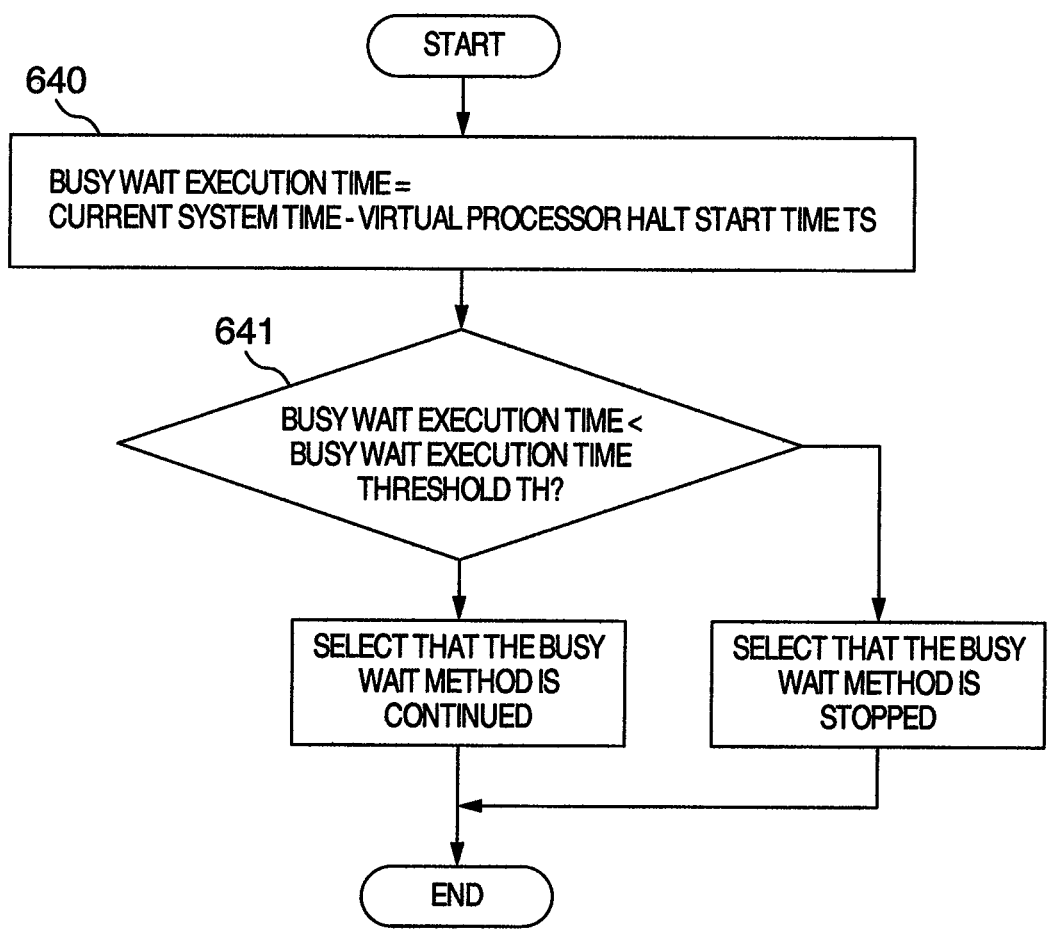
FIG. 12 is a flow chart of a virtual processor busy wait method continuation check process.

FIG. 12 is a flow chart of the busy wait method continuation check process in the virtual processor halt exit wait process of the virtual processor. Description will be made while the virtual processor 0 (202a) of the first virtual machine 200 is taken as an example.

In the busy wait method continuation check process in the virtual processor halt exit wait process, the current system time is subtracted from the calculated virtual processor halt start time TS (157a) to thereby calculate the busy wait execution time=TS−current system time (step 640). If the busy wait execution time is not smaller than the busy wait execution time threshold TH (step 641), the busy wait method is stopped and the blocking method is selected. In the invention, through there is expectation that the probability of the check process' taking effect will be low, the check process is provided for reducing the influence of wrong prediction even if the prediction is wrong.

The virtual processor scheduling method in consideration of both the performance of the virtual processor halt exit and the physical processor utilization ratio has been described. In the virtual machine system, power saving of the physical processor is also important. A physical processor power control method in the virtual processor scheduling method according to the invention will be described below. A method of switching the physical processor between the normal operating state and the halt state and a physical processor power control method operating with the virtual processor scheduling method will be described successively. Although the following method need not be embedded, power consumption of the physical processor can be reduced when the following method is embedded.

The method of switching the physical processor between the normal operating state and the halt state will be described. The physical processor 0 (002a) and the physical processor structure 0 (110) of the physical processor 0 (002a) are taken as an example. The physical processor 1 (002b) and the physical processor structure 1 (110) of the physical processor 1 (002b) can be described in the same manner. The physical processor state PS 111 of the physical processor takes the two values of an normal operating state PEXE and a halt state PHLT like the virtual processor state VS of the virtual processor. To switch the physical processor 0 (002a) from the normal operating state to the halt state, the virtual machine monitor 100 sets the physical processor state PS 111 of the physical processor structure 0 (110) to be the halt state PHLT just before the switching. To switch the physical processor 0 (002a) from the halt state to the normal operating state, the virtual machine monitor 100 sets the physical processor state PS 111 of the physical processor structure 0 (110) to be the normal operating state PEXE just after the physical processor 0 (002a) returns to the normal operating state and the virtual machine monitor 100 begins to start execution on the physical processor 0 (002a).

The physical processor power control method operating with the virtual processor scheduling will be described.

Figure 14A:
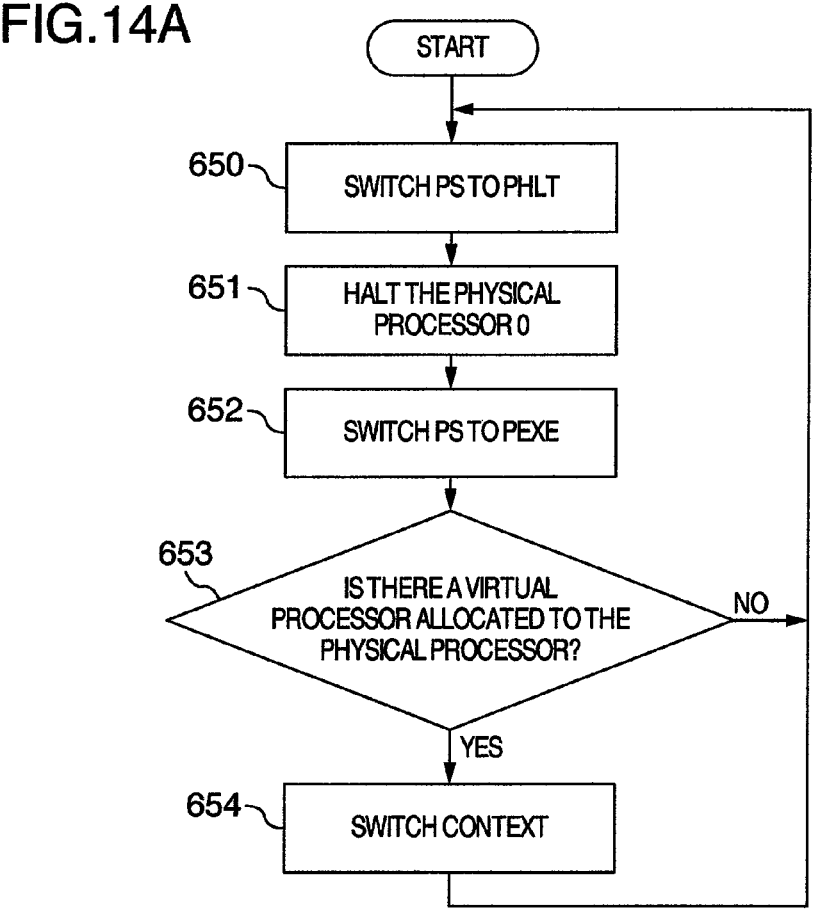
FIGS. 14A and 14B are flow charts of an idle loop process in which physical processor power control is incorporated.
Figure 14B:
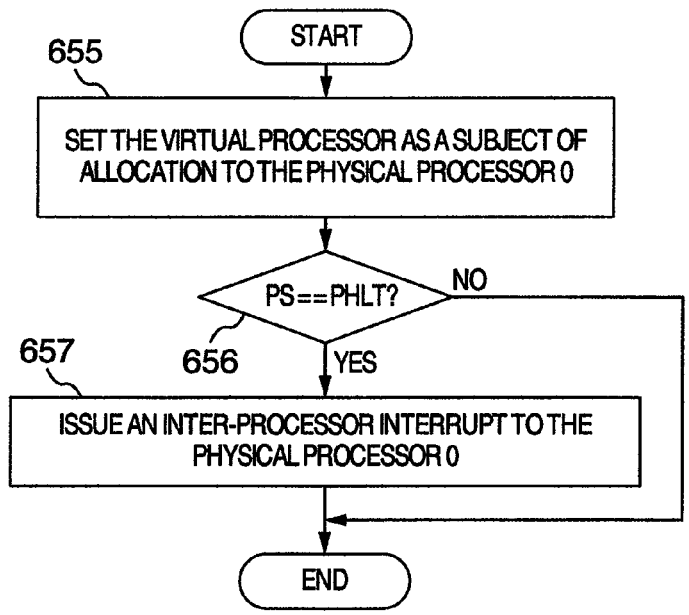

FIGS. 14A and 14B are flow charts showing an idle loop of an idle process in which a physical processor halt process is implemented, and a virtual processor allocation request notification process in which the physical processor halt exit process is implemented. The case where the idle process 020a runs on the physical processor 0 (002a) is taken as an example.

When there is no virtual processor running on the physical processor 0 (002a), the idle process 020a associated with the physical processor starts execution of an idle loop. In the idle loop, the physical processor 0 (002a) is halted to prevent physical processor resources from being spent due to spin loop execution. If the physical processor state PS 111 is set to be the halt state PHLT when the virtual machine monitor 100 designates the physical processor 0 (002a) to schedule the virtual processor on the physical processor 0 (002a), the virtual machine monitor 100 issues an inter-processor interrupt to the physical processor 0 (002a) so that the physical processor exits from the halt state. When the physical processor 0 (002a) exits from the halt state, execution of the idle process is resumed. When any virtual processor to be scheduled on the physical processor is found, the virtual machine monitor 100 executes content switching to the virtual processor and resumes the virtual processor. If there is no virtual processor found, the physical processor 0 (002a) is halted again.

Figure 15A:
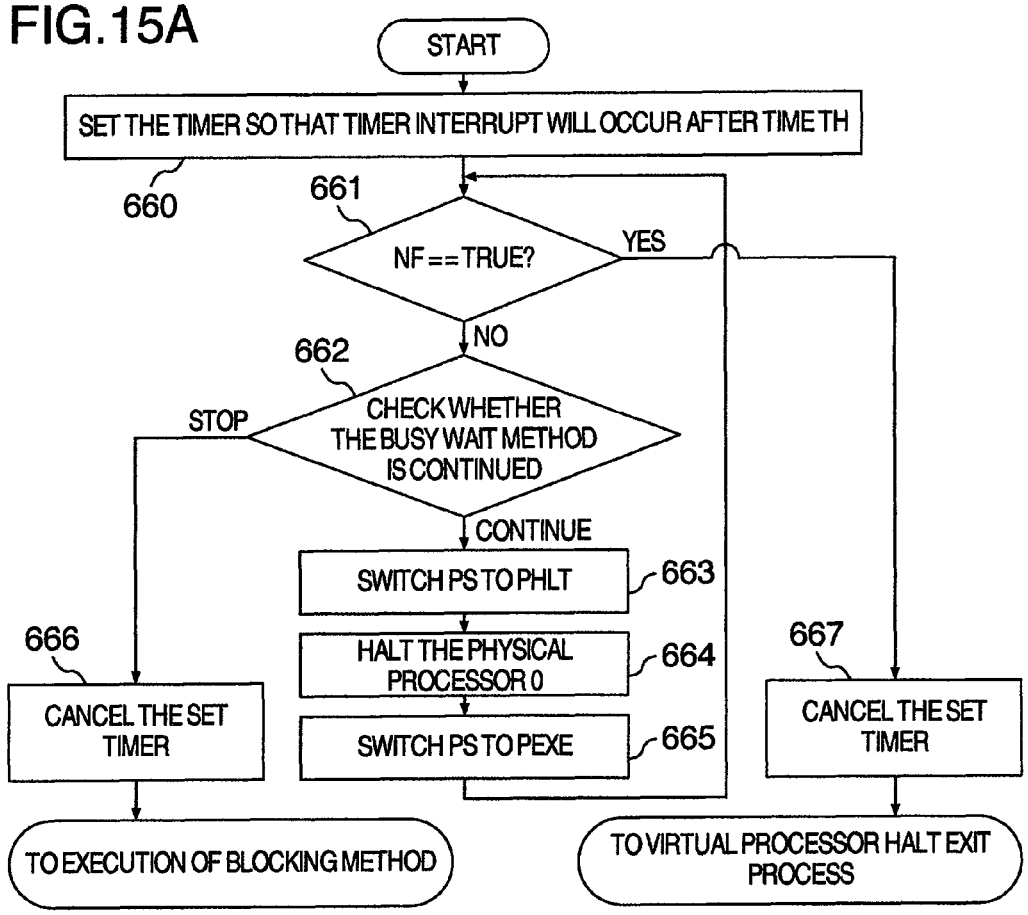
FIGS. 15A and 15B are flow charts of the busy wait process and the virtual processor resume notification process in the virtual processor resume wait process in which physical processor power control is incorporated.
Figure 15B:
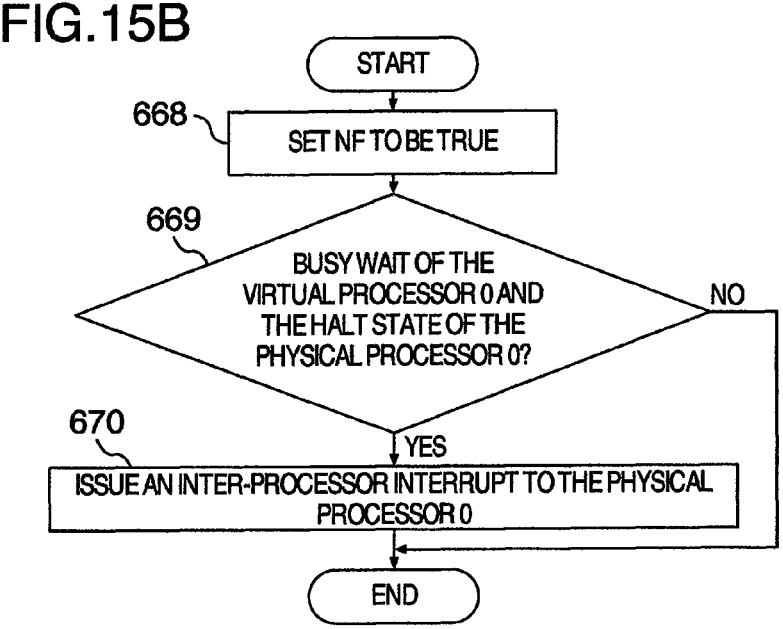

FIGS. 15A and 15B are flow charts showing the busy wait process in the virtual processor halt exit wait process in which the physical processor halt process is implemented, and the virtual halt exit notification process of the virtual processor in which the physical processor halt exit process is implemented. The case where the virtual processor 0 of the first virtual machine operates on the physical processor 0 is taken as an example.

When the busy wait method is selected in the virtual halt exit wait process, the virtual processor 0 sets the timer so that a timer interrupt will occur on the physical processor 0 with the lapse of the busy wait execution time threshold TH from that time point so that the physical processor will exit from the halt state so that the busy wait method continuation check process operates even when the physical processor 0 is halted. In the loop of the busy wait method, the physical processor is halted.

When the fact that the virtual processor halt exit notification flag NF of the virtual processor 0 is true is detected or when the busy wait method continuation check process takes effect, the busy wait method is terminated. If the set timer is still effective on this occasion, the timer is canceled.

If the virtual processor 0 (202a) is executing the busy wait process on the physical processor 0 (002a) but the physical processor 0 (002a) is in the halt state when the virtual machine monitor 100 detects a request to switch the virtual processor 0 (202a) to the virtual halt state, sets the virtual processor halt exit notification flag NF (154a) of the virtual processor 0 (202a) to be true and then examines the state of the virtual processor 0 (202a), the virtual machine monitor 100 issues an inter-processor interrupt to the physical processor 0 (002a).

According to the virtual processor scheduling method of the invention, the virtual processor halt duration predicted value is used so that the processing time required for switching the virtual processor from the virtual halt state to the virtual normal operating state can be reduced to resume the execution of a program on the virtual processor quickly when the halt of the virtual processor occurs frequently as long as the same physical processor utilization ratio and the same reduction in power consumption as in the background-art method having only the blocking method are guaranteed. In this embodiment, this fact has been described based on the configuration shown in FIGS. 1 and 2.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising: a physical computer including at least one physical processor; a virtual machine monitor; and a virtual machine including at least one virtual processor such that at least one physical processor is time-shared by the virtual machine monitor;

wherein:

the virtual machine monitor controls switching of a normal operating state or a halt state of the physical processor and switching of a virtual normal operating state or a virtual halt state of the virtual processor as scheduling of the physical processor and the virtual processor;

when the virtual processor in the virtual halt state is waiting to cancel the virtual halt state and switch the virtual halt state to the normal operating state, the virtual machine monitor selects either of a busy wait method for making repeated examination until the virtual halt state exits while the virtual processor stays on the physical processor and a blocking method for suspending execution of the virtual processor and scheduling another virtual processor on the physical processor while yielding the operating physical processor and checking off scheduling of the virtual processor to the physical processor, based on information of a virtual processor halt duration of the virtual processor;

a duration from a time point where the virtual processor begins to wait for setting a virtual processor halt exit notification flag of the virtual processor to be true to a time point where the virtual processor halt exit notification flag is set to be true is regarded as the virtual processor halt duration;

an average value of the latest N virtual processor halt durations of the virtual processor is regarded as a virtual processor halt duration predicted value of the virtual processor;

the virtual processor halt duration is updated by adding to the previous sum of the latest N virtual processor halt durations and subtracting the oldest virtual processor halt duration and then the updated sum of latest N virtual processor halt durations is divided by N to thereby calculate the virtual processor halt duration predicted value of the virtual processor which will be halted at a next time;

when the virtual processor waits for virtual halt exit, the virtual processor halt duration predicted value of the virtual processor is added to the current time to thereby calculate a virtual processor halt exit time predicted value of the virtual processor;

when the blocking method is selected as a virtual processor halt exit wait method, the calculated virtual processor halt exit time predicted values are sorted in ascending order of the latest due date and inserted in a virtual processor exit time management queue corresponding to each physical processor to thereby manage a plurality of virtual processor halt exit time predicted values of the virtual processor in accordance with each physical processor so that the virtual processor halt exit time predicted value is removed from the virtual processor halt exit time management queue when the virtual halt state of the processor exits; and either of the busy wait method or the blocking method is selected dynamically as a virtual processor halt exit wait method in accordance with the plurality of predicted values calculated based on the virtual processor halt durations.

2. A computer system according to claim 1, wherein:

when the virtual processor is in the virtual normal operating state, the virtual machine monitor enables execution of any program on the virtual processor as long as the virtual processor is running on the physical processor in the normal operating state; and when the virtual processor is in the virtual halt state, the virtual machine monitor disables execution of any program on the virtual processor.

3. A computer system according to claim 1, wherein:

the virtual machine monitor controls switching of the normal operating state or the halt state of the physical processor and switching of the virtual normal operating state or the virtual halt state of the virtual processor independently as scheduling of the physical processor and the virtual processor;

the virtual machine monitor detects a request to switch the virtual processor to the halt state of the virtual processor running on the physical processor in the normal operating state without direct hardware execution and switches the virtual processor to the virtual halt state in response of the request; and the virtual machine monitor detects a request to switch the virtual processor from the virtual halt state to the virtual normal operating state without direct hardware execution and switches the virtual processor to the virtual normal operating state in response to the request.

4. A computer system according to claim 1, wherein selection of either of the busy wait method and the blocking method is executed whenever the virtual processor in the virtual halt state waits for virtual halt exit of the virtual processor.

5. A computer system according to claim 1, wherein:

when the busy wait method is selected, the virtual machine monitor performs repeated examination until a virtual processor halt exit notification flag of the virtual processor is set to be true;

when the virtual machine monitor detects that the virtual processor halt exit notification flag of the virtual processor has been set to be true, the virtual machine monitor executes switching of the virtual processor from the virtual halt state to the virtual normal operating state and enables execution of any program on the virtual processor;

when the blocking method is selected, the virtual machine monitor suspends execution of the virtual processor and yields the operating physical processor;

the virtual machine monitor checks off scheduling of the virtual processor to the physical processor until a virtual processor halt exit notification flag of the virtual processor is set to be true;

the virtual machine monitor schedules another virtual processor on the physical processor while the virtual processor is suspended;

when the virtual machine monitor detects a request to switch the waiting virtual processor from the virtual halt state to the virtual normal operating state, the virtual machine monitor sets the virtual processor halt exit notification flag of the virtual processor to be true;

the virtual machine monitor restores allocation of the physical processor to the virtual processor; and when the virtual processor is selected to be scheduled on the physical processor, the virtual machine monitor detects that the virtual processor halt exit notification flag of the virtual processor has been set to be true, and executes switching of the virtual processor from the virtual halt state to the virtual normal operating state to thereby enable execution of any program on the virtual processor.

6. A computer system according to claim 1, wherein the busy wait method is selected when the virtual processor halt duration predicted value of the virtual processor is shorter than a predetermined blocking method processing time cost.

7. A computer system according to claim 1, wherein the blocking method is selected when the virtual processor halt duration predicted value of the virtual processor is not shorter than a predetermined blocking method processing time cost and there is a virtual processor to be allocated to an operating physical processor.

8. A scheduling method in a virtual machine monitor for constructing a virtual machine having at least one virtual processor by time-sharing a physical computer having at least one physical processor and for controlling switching of an normal operating state or a halt state of the physical processor and switching of a virtual normal operating state or a virtual halt state of the virtual processor, wherein:

when a virtual processor in the virtual halt state is waiting to cancel the virtual halt state and switch the virtual halt state to the normal operating state, either of a busy wait method for making repeatedly examination until the virtual halt state exits while the virtual processor stays on the physical processor and a blocking method for stopping execution of the virtual processor and operating another virtual processor on the physical processor while yielding the operating physical processor and checking off scheduling of the virtual processor to the physical processor, is selected based on information of a virtual processor halt duration of the virtual processor;

a duration from a time point where the virtual processor begins to wait for setting a virtual processor halt exit notification flag of the virtual processor to be true to a time point where the virtual processor halt exit notification flag is set to be true is regarded as the virtual processor halt duration;

an average value of the latest N virtual processor halt durations of the virtual processor is regarded as a virtual processor halt duration predicted value of the virtual processor;

the virtual processor halt duration is updated by adding to the previous sum of latest N virtual processor halt durations and subtracting the oldest virtual processor halt duration and then the updated sum of latest N virtual processor halt durations is divided by N to thereby calculate a virtual processor halt duration predicted value of the virtual processor which will be halted at next time;

when the blocking method is selected as a virtual processor halt exit wait method, the calculated virtual processor halt exit time predicted values are sorted in ascending order of the latest due date and inserted in a virtual processor halt exit time management queue corresponding to each physical processor to thereby manage a plurality of virtual processor halt exit time predicted values of the virtual processor in accordance with each physical processor so that the virtual processor halt exit time predicted value is removed from the virtual processor halt exit time management queue when the virtual halt state of the virtual processor exits; and either of the busy wait method or the blocking method is selected dynamically as a virtual processor halt exit wait method in accordance with the plurality of predicted values calculated based on the virtual processor halt durations.

* * * * *